United States Patent
Jo

(10) Patent No.: US 8,798,395 B2
(45) Date of Patent: Aug. 5, 2014

(54) IMAGE PROCESSING APPARATUS, IMAGE PROCESSING METHOD, AND PROGRAM

(75) Inventor: Kensei Jo, Tokyo (JP)

(73) Assignee: Sony Corporation, Tokyo (JP)

( * ) Notice: Subject to any disclaimer, the term of this patent is extended or adjusted under 35 U.S.C. 154(b) by 45 days.

(21) Appl. No.: 13/563,350

(22) Filed: Jul. 31, 2012

(65) Prior Publication Data

US 2013/0051700 A1 Feb. 28, 2013

(30) Foreign Application Priority Data

Aug. 31, 2011 (JP) .................................. 2011-190055
Dec. 19, 2011 (JP) .................................. 2011-277629

(51) Int. Cl.
*G06K 9/36* (2006.01)
*G06K 9/40* (2006.01)

(52) U.S. Cl.
USPC ........................................ 382/284; 382/254

(58) Field of Classification Search
USPC ......... 382/263–264, 274–275, 284, 300, 305, 382/312; 358/525; 345/606, 611, 629; 348/36
See application file for complete search history.

(56) References Cited

U.S. PATENT DOCUMENTS

| 7,756,407 | B2 * | 7/2010 | Raskar | 396/55 |
| 8,072,498 | B2 * | 12/2011 | Ito et al. | 348/208.4 |
| 8,224,176 | B1 * | 7/2012 | Pillman et al. | 396/242 |
| 8,570,389 | B2 * | 10/2013 | Sorek et al. | 348/222.1 |

FOREIGN PATENT DOCUMENTS

JP      2000-050151 A     2/2000

* cited by examiner

*Primary Examiner* — Kanjibhai Patel
(74) *Attorney, Agent, or Firm* — Wolf, Greenfield & Sacks, P.C.

(57) ABSTRACT

There is provided an image processing apparatus including: an exposure compensation unit carrying out exposure compensation of a long exposure image and a short exposure image in keeping with an exposure ratio; a blur information measuring unit using the exposure-compensated images to calculate blur information showing a degree of discrepancy between pixel values at a corresponding pixel position in the long exposure image and the short exposure image; a blending coefficient calculating unit using the blur information to decide a blending coefficient to be used in a blending process on pixel values at the corresponding pixel position in the long exposure image and the short exposure image; and a blending unit carrying out the blending process on the pixel values at the corresponding pixel position in the long exposure image and the short exposure image using the calculated blending coefficient to decide the pixel value of an output image.

16 Claims, 21 Drawing Sheets

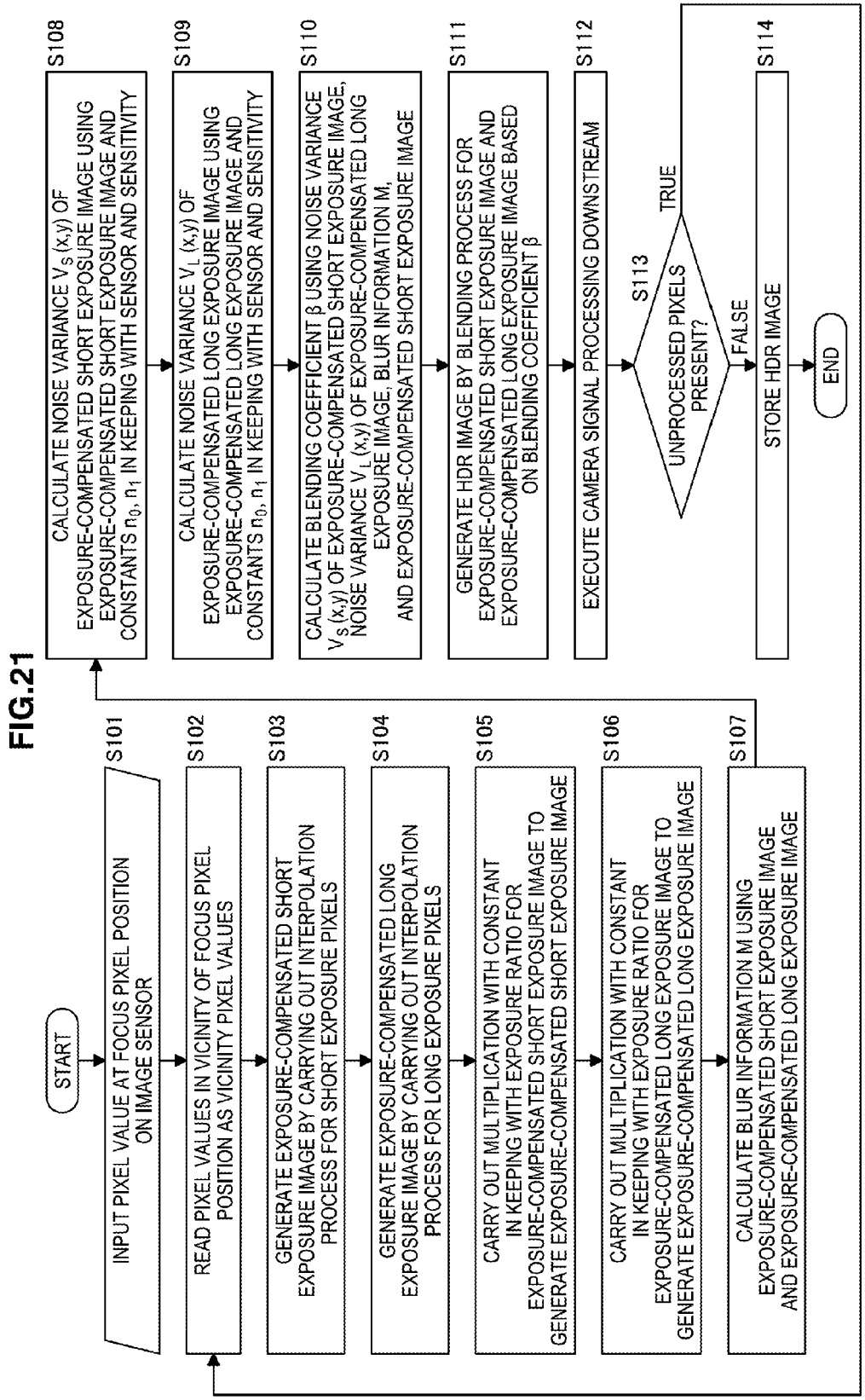

IMAGE PROCESSING APPARATUS, IMAGE PROCESSING METHOD, AND PROGRAM

BACKGROUND

The present disclosure relates to an image processing apparatus, an image processing method, and a program. In particular, the present disclosure relates to an image processing apparatus, an image processing method, and a program that generate images with a high dynamic range (wide dynamic range).

A solid-state image pickup device such as a CCD image sensor or a CMOS (Complementary Metal Oxide Semiconductor) image sensor used in a video camera or a digital still camera carries out photoelectric conversion by accumulating charge in keeping with the amount of incident light and outputting an electrical signal corresponding to the accumulated charge. However, there is a limit on the amount of charge that can be accumulated in a photoelectric conversion element, so that when a certain amount of light has been received, a saturation level is reached, resulting in regions of a subject with a certain brightness or higher being set at a saturation luminance level, a problem referred to as "blown out highlights" or "clipping".

To prevent clipping, processing is carried out to control the charge accumulation period of the photoelectric conversion element in accordance with the change in light from outside or the like to adjust the exposure length and thereby optimize sensitivity. For example, by using a high shutter speed to shorten the exposure length for a bright subject, the charge accumulation period of the photoelectric conversion element is reduced and an electrical signal is outputted before the amount of accumulated charge reaches the saturation level. By carrying out such processing, it is possible to output an image in which tones are correctly reproduced for the subject.

However, if a high shutter speed is used when photographing a subject in which both bright and dark regions are present, the exposure length will not be sufficient for the dark regions, which will result in deterioration in the S/N ratio and a fall in image quality. To correctly reproduce the luminance levels of bright regions and dark regions in a photographed image of a subject that includes both bright and dark regions, it is necessary to use a long exposure for pixels on the image sensor where there is little incident light to achieve a high S/N ratio and to carry out processing to avoid saturation for pixels with large amounts of incident light.

As a method of realizing such processing, a method that consecutively picks up a plurality of images with different exposure lengths and blends the images is known. That is, there is a method that separately and consecutively picks up a long exposure image and a short exposure image and carries out a blending process using the long exposure image for dark image regions and the short exposure image for bright image regions with blown-out highlights in the long exposure image to generate a single image. In this way, by combining a plurality of images with different exposures, it is possible to obtain an image with the wide dynamic range with no blown-out highlights, that is, a high-dynamic range (HDR) image.

As one example, Japanese Laid-Open Patent Publication No. 2000-50151 discloses a configuration that picks up two images in which a plurality of different exposure lengths are set and obtains an HDR image by combining such images. Such processing will now be described with reference to FIG. 1. An image pickup device outputs image data with two different exposure lengths within a video rate (30-60 fps) during pickup of moving images, for example. During the pickup of still images also, image data with two different exposure lengths is generated and outputted. FIG. 1 is a diagram useful in explaining the characteristics of images with two different exposure lengths (that is, a long exposure image and a short exposure image) generated by the image pickup device. The horizontal axis shows time (t) and the vertical axis shows accumulated charge (e) in a light-receiving photodiode (PD) that constructs a photoelectric conversion element corresponding to one pixel of a solid-state image pickup element.

For example, if a large amount of light has been received by the light-receiving photodiode (PD), that is, when the subject is bright, there is a sudden rise in the accumulated charge over time as shown in a high luminance region 11 shown in FIG. 1. Meanwhile, if little light has been received by the light-receiving photodiode (PD), that is, when the subject is dark, there is a gradual rise in the accumulated charge over time as shown in a low luminance region 12 in FIG. 1.

The time t0 to t3 corresponds to the exposure length TL for acquiring the long exposure image. Even when this long exposure length TL is set, as can be understood from the line showing the low luminance region 12, the accumulated charge will not reach the saturation level even at time t3 (the non-saturated point Py), which means accurate tone reproduction is achieved from a tone level of a pixel decided using an electrical signal obtained based on such accumulated charge Sa.

However, according to the line showing the high luminance region 11, it is clear that the accumulated charge will have already reached the saturation level (the saturation point Px) before the time t3 is reached. Accordingly, for such high luminance region 11, it is only possible to obtain pixel values corresponding to an electrical signal with the saturation level from the long exposure image, resulting in the pixels being blown-out highlights.

For this reason, in the high luminance region 11, at a time before the time t3 is reached, for example, at the time t1 (a charge sweep start point P1) in FIG. 1, the charge accumulated in the light-receiving photodiode (PD) is swept out. This sweeping of charge does not sweep out all of the charge accumulated in the light-receiving photodiode (PD) and is assumed to reduce the charge to an intermediate voltage holding level that is controlled in the light-receiving photodiode (PD). After this charge sweeping process, a short exposure is taken again with the exposure length TS (t2 to t3). That is, a short exposure is taken for the period from a short exposure start point P2 to a short exposure end point P3 shown in FIG. 1. The accumulated charge (Sb) is obtained by this short exposure and the tone level of a pixel is decided based on the electrical signal obtained based on this accumulated charge (Sb).

Note that when a pixel value is decided based on the electrical signal based on the accumulated charge (Sa) obtained by the long exposure in the low luminance region 12 and the accumulated charge (Sb) obtained by the short exposure in the high luminance region 251, the pixel value level is decided based on the estimated accumulated charge for a case when exposure is carried out for the same time or on the calculation result when an electrical signal output value corresponding to such estimated accumulated charge is calculated.

In this way, by combining the short exposure image and the long exposure image, it is possible to obtain an image with high dynamic range and with no blown-out highlights.

However, with the configuration disclosed in Japanese Laid-Open Patent Publication No. 2000-50151, it is necessary to carry out processing that separately picks up the long exposure image and the short exposure image and combines the images.

In this way, although it is possible to generate a high dynamic range (HDR) image using a plurality of images in which the exposure length is changed, the processing based on such plurality of images has the following problem. Since the long exposure image has a longer exposure compared to the short exposure image, there is the problem of a drop in image quality due to occurrence of blurring caused by camera shake or subject movement and the occurrence of color loss and fake colors for a moving subject.

SUMMARY

The present disclosure aims to provide an image processing apparatus, an image processing method, and a program capable of generating a high-quality high dynamic range image with suppressed blurred due for example to subject movement.

According to a first aspect of the present disclosure, there is provided an image processing apparatus including an image processing unit generating a pixel value of an output image by carrying out a pixel value blending process on a long exposure image and a short exposure image. The image processing unit includes an exposure compensation unit carrying out exposure compensation of the long exposure image and the short exposure image in keeping with an exposure ratio between long exposure and short exposure, a blur information measuring unit using the long exposure image and the short exposure image after the exposure compensation to calculate blur information that is an index value showing a degree of discrepancy between pixel values at a corresponding pixel position in the long exposure image and the short exposure image, a blending coefficient calculating unit using the blur information to decide a blending coefficient as a blending ratio to be used in the pixel value blending process on the pixel values at the corresponding pixel position in the long exposure image and the short exposure image, and a blending unit carrying out the pixel value blending process on the pixel values at the corresponding pixel position in the long exposure image and the short exposure image using the blending coefficient calculated by the blending coefficient calculating unit to decide the pixel value of the output image.

Further, in an embodiment of the image processing apparatus according to the present disclosure, the image processing unit inputs one image in which long exposure pixels and short exposure pixels are mixed, and further includes a sensitivity-specific interpolation unit carrying out an interpolation process on an input image to generate a long exposure image in which all pixels are set at pixel values of long exposure pixels and a short exposure image in which all pixels are set at pixel values of short exposure pixels, and an exposure compensation unit carrying out exposure compensation in keeping with an exposure ratio between the long exposure pixels and the short exposure pixels on the long exposure image and the short exposure image outputted by the sensitivity-specific interpolation unit, and the blur information measuring unit calculates the blur information using the exposure-compensated long exposure image and the exposure-compensated short exposure image generated by the exposure compensation unit.

Further, in an embodiment of the image processing apparatus according to the present disclosure, the blending coefficient calculating unit uses the blur information to decide the blending coefficient as the blending ratio to be used in the pixel value blending process on the pixel values at the corresponding pixel position in the exposure-compensated long exposure image and the exposure-compensated short exposure image.

Further, in an embodiment of the image processing apparatus according to the present disclosure, the blending unit decides the pixel value of the output image by carrying out the pixel value blending process on the pixel values at the corresponding pixel position in the exposure-compensated long exposure image and the exposure-compensated short exposure image using the blending coefficient calculated by the blending coefficient calculating unit.

Further, in an embodiment of the image processing apparatus according to the present disclosure, the blur information measuring unit calculates the blur information for each color using the long exposure image and the short exposure image that have been subjected to the exposure compensation and outputs a maximum value out of the blur information for each color at each pixel position as the blur information corresponding to each pixel.

Further, in an embodiment of the image processing apparatus according to the present disclosure, the blur information measuring unit includes a noise estimating unit estimating noise included in the long exposure image and the short exposure image and calculates the blur information corresponding to a pixel by subtracting the noise estimated by the noise estimating unit from a value calculated based on a difference in pixel values of corresponding pixels in the long exposure image and the short exposure image that have been subjected to the exposure compensation.

Further, in an embodiment of the image processing apparatus according to the present disclosure, for pixels where a pixel value in the long exposure image is at a saturation level, the blending coefficient calculating unit calculates a blending coefficient that suppresses the blending ratio of the pixel value of the long exposure image.

Further, in an embodiment of the image processing apparatus according to the present disclosure, the blending unit carries out the pixel value blending process on the pixel values at corresponding pixel positions in the long exposure image and the short exposure image to generate a high dynamic range (HDR) image as the output image.

According to a second aspect of the present disclosure, there is provided an image processing method executed by an image processing apparatus including an image processing unit executing image processing that generates a pixel value of an output image by carrying out a pixel value blending process on a long exposure image and a short exposure image. The image processing includes carrying out exposure compensation of the long exposure image and the short exposure image in keeping with an exposure ratio between long exposure and short exposure, using the long exposure image and the short exposure image after the exposure compensation to calculate blur information that is an index value showing a degree of discrepancy between pixel values at a corresponding pixel position in the long exposure image and the short exposure image, using the blur information to decide a blending coefficient as a blending ratio to be used in the pixel value blending process on the pixel values at the corresponding pixel position in the long exposure image and the short exposure image, and carrying out the pixel value blending process on the pixel values at the corresponding pixel position in the long exposure image and the short exposure image using the calculated blending coefficient to decide the pixel value of the output image.

According to a third aspect of the present disclosure, there is provided a program causing an image processing apparatus to execute image processing that generates a pixel value of an output image by carrying out a pixel value blending process on a long exposure image and a short exposure image, the image processing including carrying out exposure compensation of the long exposure image and the short exposure image in keeping with an exposure ratio between long exposure and short exposure, using the long exposure image and the short exposure image after the exposure compensation to calculate blur information that is an index value showing a degree of discrepancy between pixel values at a corresponding pixel position in the long exposure image and the short exposure image, using the blur information to decide a blending coefficient as a blending ratio to be used in the pixel value blending process on the pixel values at the corresponding pixel position in the long exposure image and the short exposure image, and carrying out the pixel value blending process on the pixel values at the corresponding pixel position in the long exposure image and the short exposure image using the calculated blending coefficient to decide the pixel value of the output image.

Note that as one example, the program according to the present disclosure is a program that can be provided via a computer-readable recording medium or a communication medium to an information processing apparatus or a computer system capable of executing various program code. By providing the program in a computer-readable format, processing according to the program is realized on the information processing apparatus or computer system.

Other objects and advantages of the present disclosure should become apparent from the following embodiments of the disclosure and the detailed description based on the attached drawings. Note that the expression "system" in this specification refers to a logical grouping of a plurality of apparatuses and that the apparatuses of the respective configurations are not limited to being present within the same housing.

According to an embodiment of the present disclosure, an apparatus and method that generate an HDR image by carrying out a pixel value blending process on long exposure pixels and short exposure pixels are realized.

More specifically, an image processing apparatus includes an image processing unit generating a pixel value of an output image by carrying out a pixel value blending process on a long exposure image and a short exposure image. The image processing unit includes: a blur information measuring unit measuring blur information using the long exposure image and the short exposure image; a blending coefficient calculating unit using the measured blur information to decide a blending coefficient for the long exposure image and the short exposure image; and a blending unit carrying out the pixel value blending process on the long exposure image and the short exposure image using the blending coefficient calculated by the blending coefficient calculating unit. By controlling the blending coefficient based on the blur information, it is possible to generate a high-quality HDR image where the influence of blurring is reduced.

BRIEF DESCRIPTION OF THE DRAWINGS

FIG. 21 is a flowchart useful in explaining an image processing sequence.

DETAILED DESCRIPTION OF THE EMBODIMENTS

Figure 1:
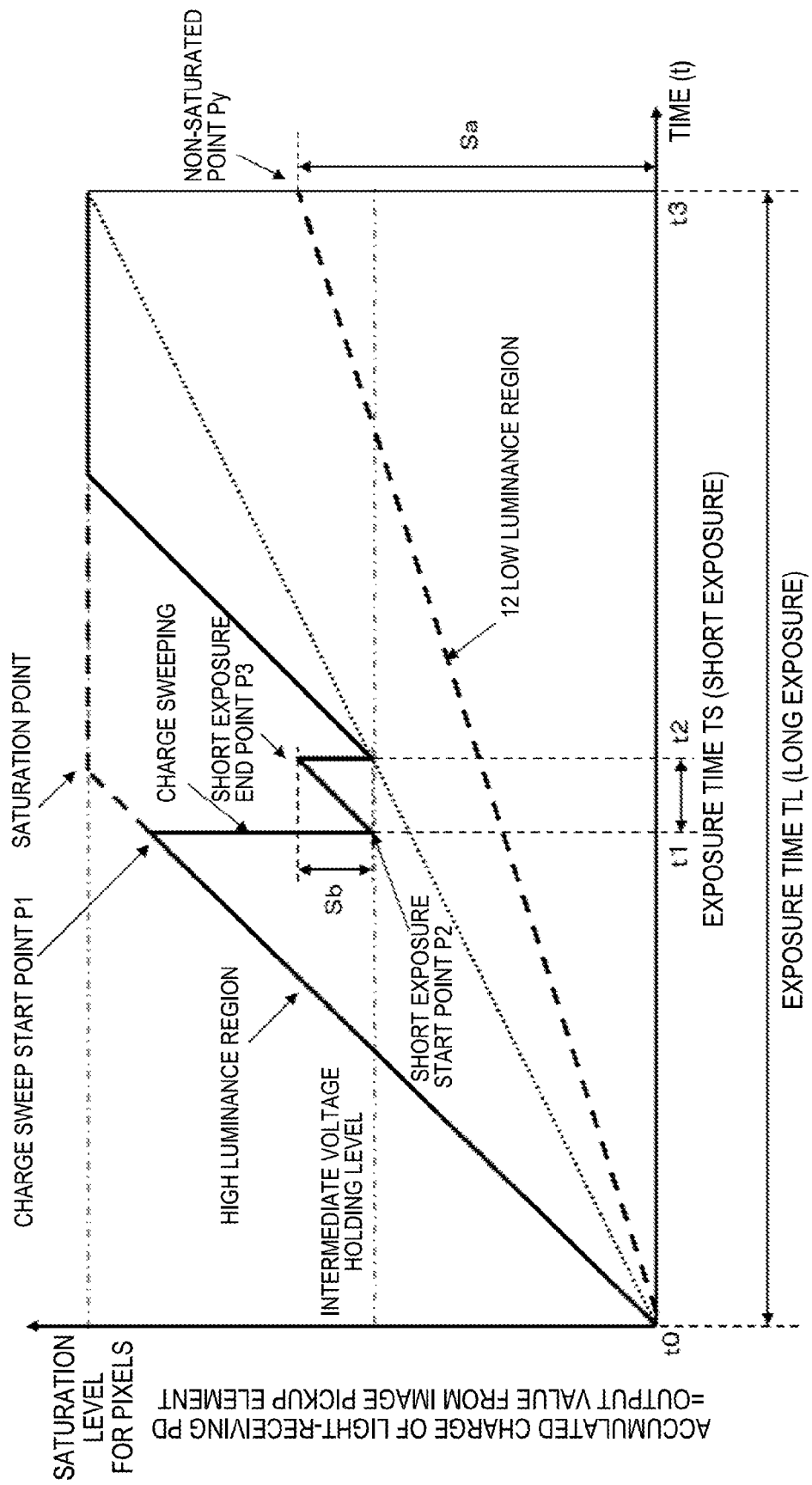
FIG. 1 is a diagram useful in explaining an example of an image pickup process for an HDR image where image pickup is carried out multiple times.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Preferred embodiments of an image processing apparatus, an image processing method, and a program according to an embodiment of the present disclosure will now be described with reference to the drawings in the order indicated below.

Figure 2:
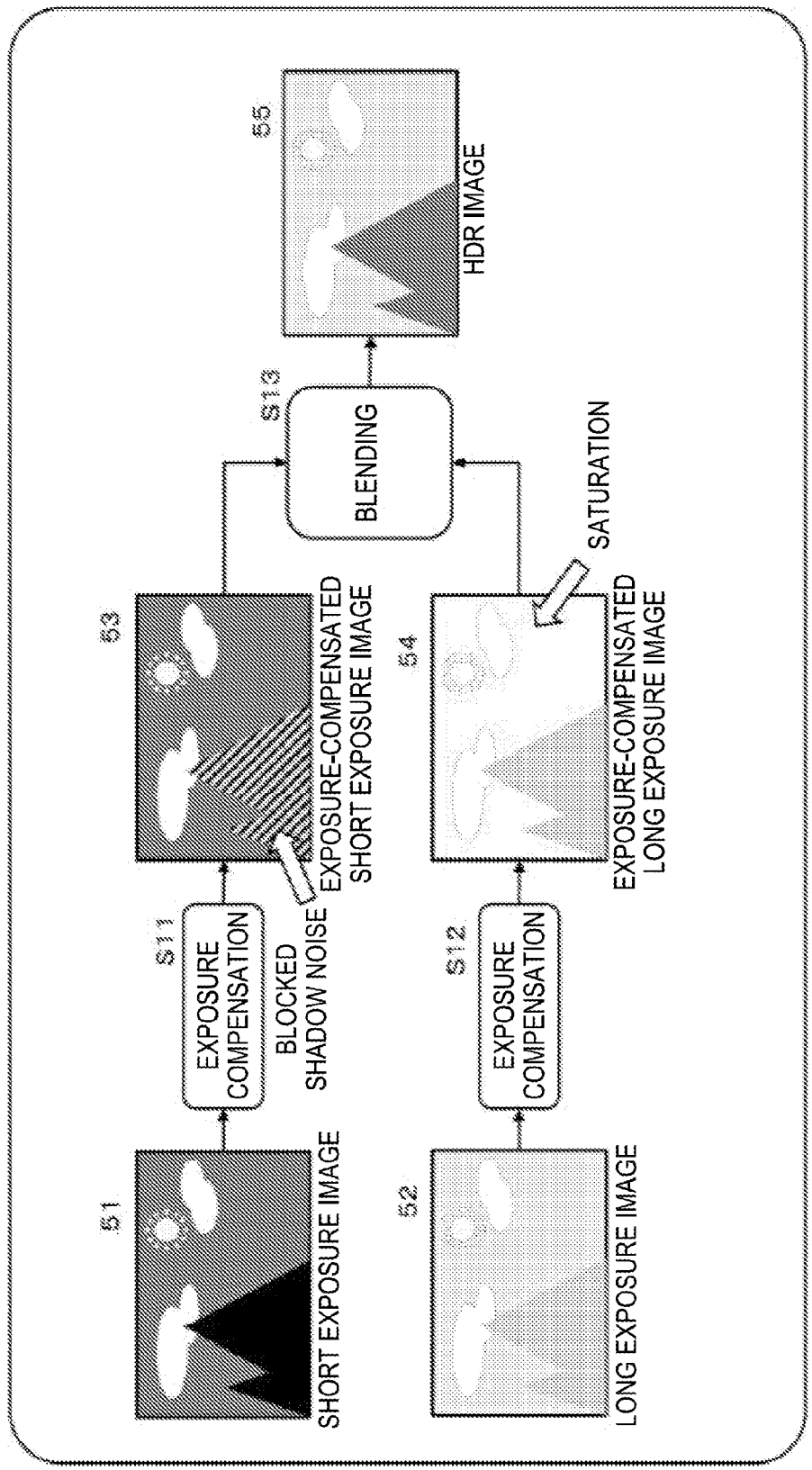
FIG. 2 is a diagram useful in explaining an overview of a generation process for an HDR image.

1. Overview of Generation Process of High Dynamic Range Image
2. Example of Process Deciding the Blending Coefficient β in Processing According to an Embodiment of the Present Disclosure
3. Example Configuration of Image Processing Apparatus
4. Example of Exposure Control Configuration for Image Pickup Element
5. Details of Processing of Image Processing Unit
6. Other Embodiments
7. Processing Sequence of Image Processing Apparatus
8. Conclusion 1. Overview of Generation Process of High Dynamic Range Image First, an overview of a generation process of a high dynamic range image will be described. It is possible to generate a high dynamic range image by combining (hereinafter, "blending") a long exposure image and a short exposure image. The generation process of a high dynamic range image will now be described with reference to FIG. 2. FIG. 2 shows an example of processing that generates a high dynamic range (hereinafter "HDR") image 55 by blending a long exposure image 51 and a short exposure image 52. The expression "blending process" used for the processing carried out by the present embodiment is the blending of corresponding pixel values of the long exposure image 51 and the short exposure image 52 in keeping with a blending coefficient β, with respective pixel values of an output image (or "blended image") being set by this blending process.

First, in steps S11 and S12, exposure compensation is carried out on the long exposure image 51 and the short exposure image 52 by multiplying with constants in keeping with an exposure ratio. As one example, when the exposure ratio is 16 for a 10-bit sensor, at the exposure compensation stage the short exposure image 52 is multiplied by sixteen, the long exposure image 51 is multiplied by one, and then in step S13 the pixel values of corresponding pixels are blended to decide the pixel values of the HDR image 55 that is the output image. Note that the short exposure image after exposure compensation is referred to as the "exposure-compensated short exposure image" and the long exposure image after exposure compensation is referred to as the "exposure-compensated long exposure image".

A specific sequence of a pixel value deciding process for the HDR image 55 that is the output image will now be described.

For example, if $D_S$ is a pixel value of the exposure-compensated short exposure image, $D_L$ is a pixel value of the exposure-compensated long exposure image, and $D_H$ is a pixel value of the outputted HDR image, the pixel values of an HDR image 105 are calculated in the blending process in step S13 according to the following equation.

$$D_H = (1.0 - \beta) \times D_S + \beta \times D_L$$

Note that the blending of pixel values according to the above equation is carried out for each corresponding pixel position in the exposure-compensated short exposure image and the exposure-compensated long exposure image. That is, the respective pixel values of the output image (HDR image) are decided by carrying out a blending process at each image pickup pixel position for the same subject.

By carrying out such processing, since the saturation pixel value of the exposure-compensated short exposure image is 1023×16=16368 (14-bit) for example, the pixel values that are outputted are also 14-bit, thereby realizing an expanded dynamic range.

However, there is the possibility that the exposure-compensated short exposure image 53 and the exposure-compensated long exposure image 54 obtained by carrying out exposure compensation that multiplies by constants in keeping with the exposure ratio in steps S11 and S12 will not store correct values as the pixel values. That is, there is the possibility that dark areas of the exposure-compensated short exposure image 53 will contain lots of noise and that bright areas of the exposure-compensated long exposure image 54 will have blown-out highlights. For this reason, during the blending process in step S13, a blending process that does not use pixel values of such erroneous pixels is carried out. By carrying out such processing, the HDR image 55 that has a high dynamic range with a favorable S/N (signal to noise) ratio from bright areas to dark areas is obtained.

The problem of blurring exists for the HDR image generation process described above. Normally, if the relative positional relationship between the subject and the camera changes during the exposure period of an image sensor, the subject will be picked up across a plurality of pixels, thereby causing details to be lost from the obtained image. Long exposure images with long exposure periods compared to short exposure images are especially susceptible to a loss of detail. For this reason, when there has been subject movement or camera shake, even if exposure is compensated for the short exposure image and the long exposure image to make the brightness even, there will be discrepancies in the pixel values between corresponding pixel positions in the long exposure image and the short exposure image. In this way, a phenomenon whereby discrepancies are produced in the pixel values of corresponding pixel positions in a long exposure image and a short exposure image, whose brightness levels have been made even by exposure compensation, due to a change in the relative positional relationship between the subject and the camera during the exposure period is hereby defined as "blurring". With the processing according to the embodiment of the present disclosure described below, it is possible to generate a high-quality HDR image in which the influence of blurring is suppressed.

First, a blending coefficient β to be used in the blending process described with reference to FIG. 2 will be explained. A blending coefficient $\beta_F$ for a case where blurring is not considered can be calculated as shown below, for example.

$$\beta_F = (V_S)/(V_S + V_L)$$

where $V_L$ is the variance of noise of a focus pixel in the exposure-compensated long exposure image, $V_S$ is the variance of noise of a focus pixel in the exposure-compensated short exposure image, and $\beta_F$ is the blending coefficient for the focus pixel in the exposure-compensated long exposure image for a case where blurring is not considered. However, compensation is carried out so that $\beta_F = 0$ for a condition where a long exposure pixel is saturated. This is described in detail later in this specification.

Figure 3:
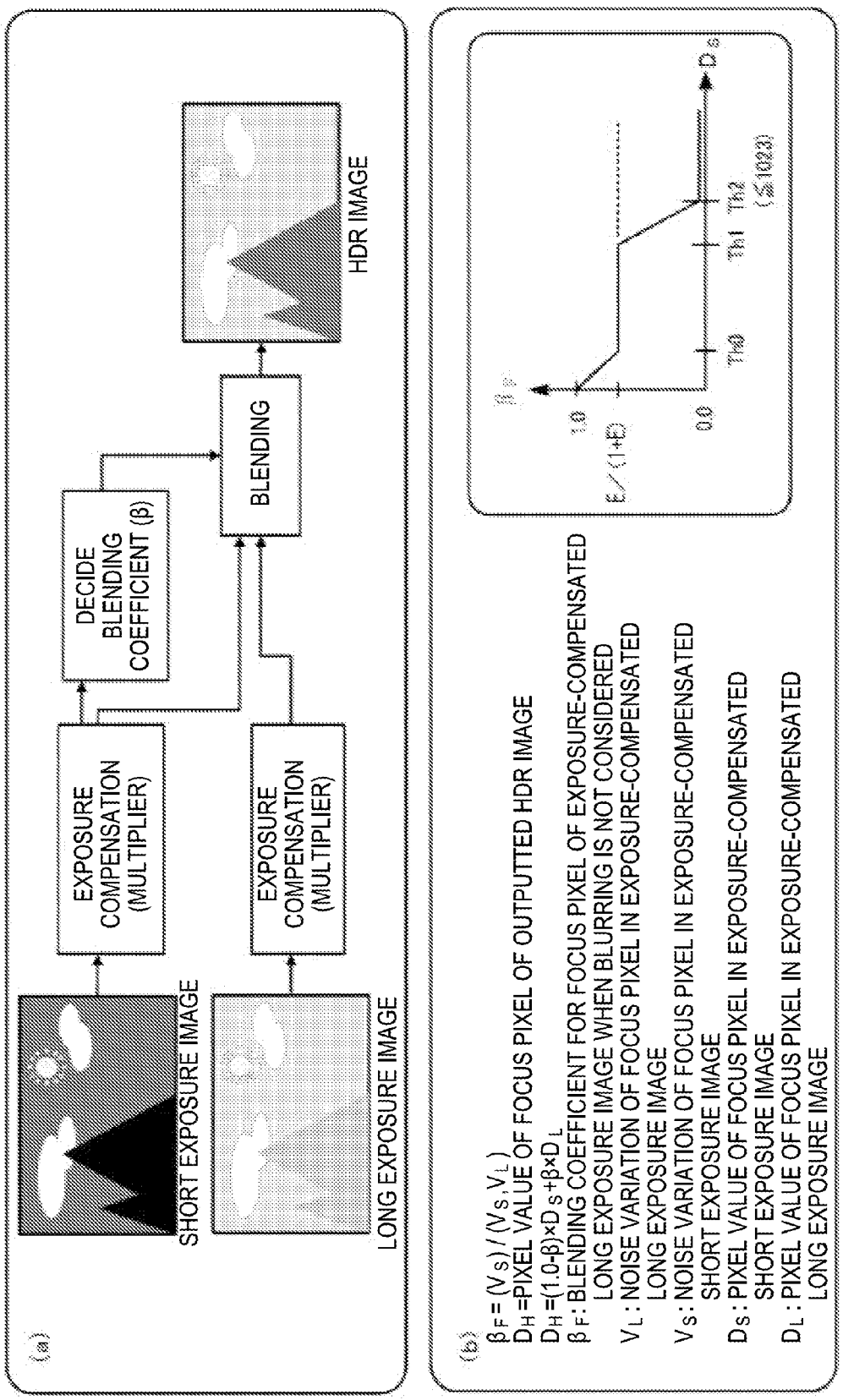
FIGS. 3A and 3B are diagrams useful in explaining an overview of a generation process for an HDR image.

A configuration for generating an HDR image according to typical blending is shown in FIGS. 3A and 3B. As shown in FIG. 3A, a short exposure image and an long exposure image are acquired, exposure compensation is carried out by multiplying with constants in keeping with the exposure ratio so that the brightness of the short exposure image and the long exposure image match, a blending coefficient is decided from the exposure-compensated short exposure image, and an HDR image is generated by carrying out a blending process based on the decided blending coefficient.

As shown in FIG. 3B, as one example it is possible to use linear approximation data corresponding to the pixel values $D_S$ of the exposure-compensated short exposure image, for example, and thereby calculate the blending coefficient $\beta_F$ from only the short exposure image. Alternatively, the blending coefficient $\beta_F$ can be calculated from only the long exposure image. Although a selection process for a blending coefficient capable of reducing noise has been subject to much consideration in the past, at present there is no method of deciding the blending coefficient with consideration to blurring, which can be due to subject movement, for example.

As described above, the blending coefficient $\beta_F$ can be calculated from only the short exposure image or the long exposure image. However, if such processing is carried out, various problems occur for the generated HDR image.

Figure 4:
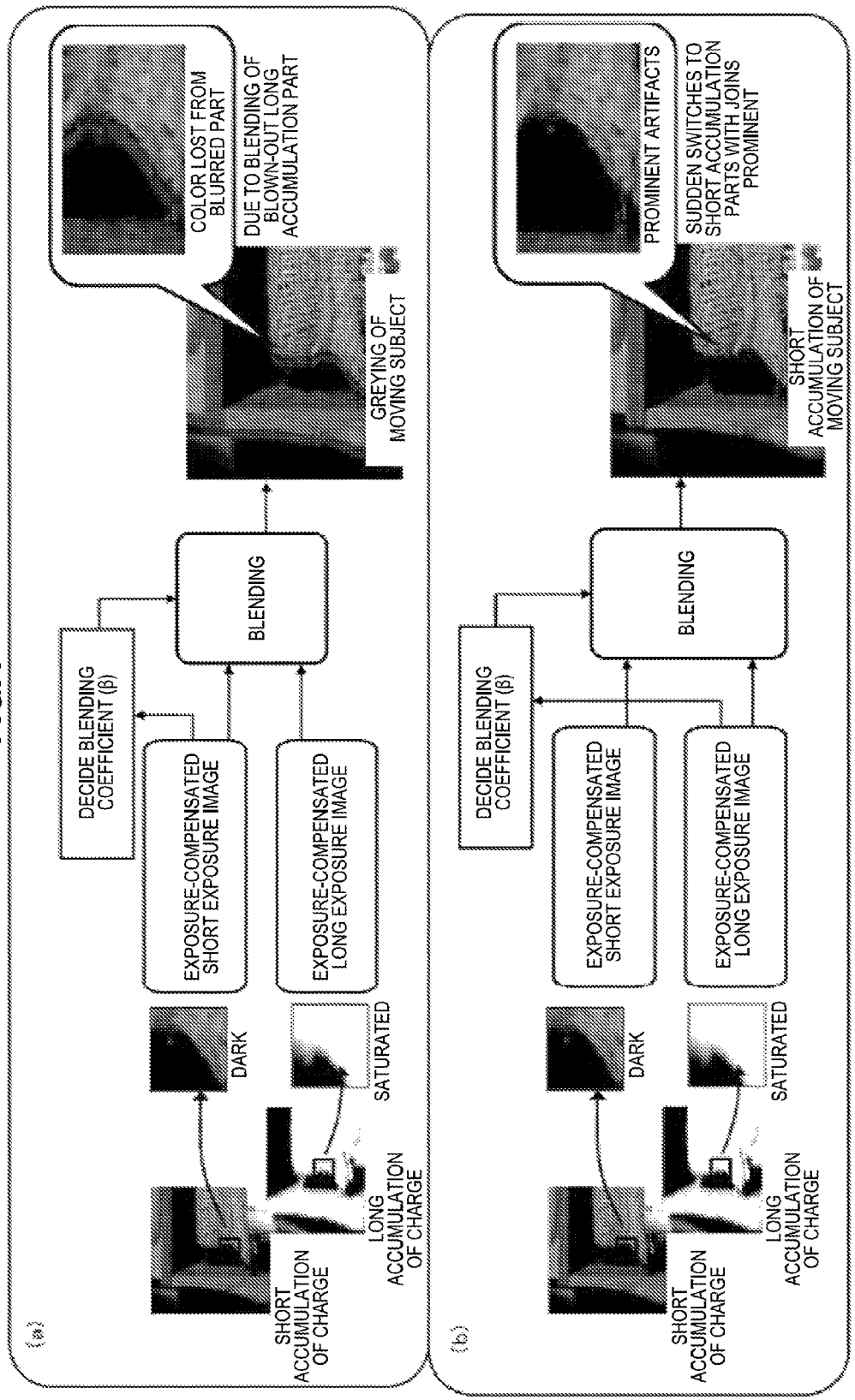
FIGS. 4A and 4B are diagrams useful in explaining problems with a generation process for an HDR image.

FIG. 4A shows a processing example for a case where the blending ratio is decided from an exposure-compensated short exposure image and FIG. 4B shows a processing example for a case where the blending ratio is decided from an exposure-compensated long exposure image. If the blending coefficient is decided from an exposure-compensated short exposure image, a phenomenon whereby colors are not correctly outputted in a blurred part of the generated HDR image will often occur. Also, if the blending coefficient is decided from an exposure-compensated long exposure image, a problem occurs in that the boundaries between the two images are prominent in the generated HDR image. Such problems are solved by the image processing according to this embodiment of the present disclosure.

Figure 5:
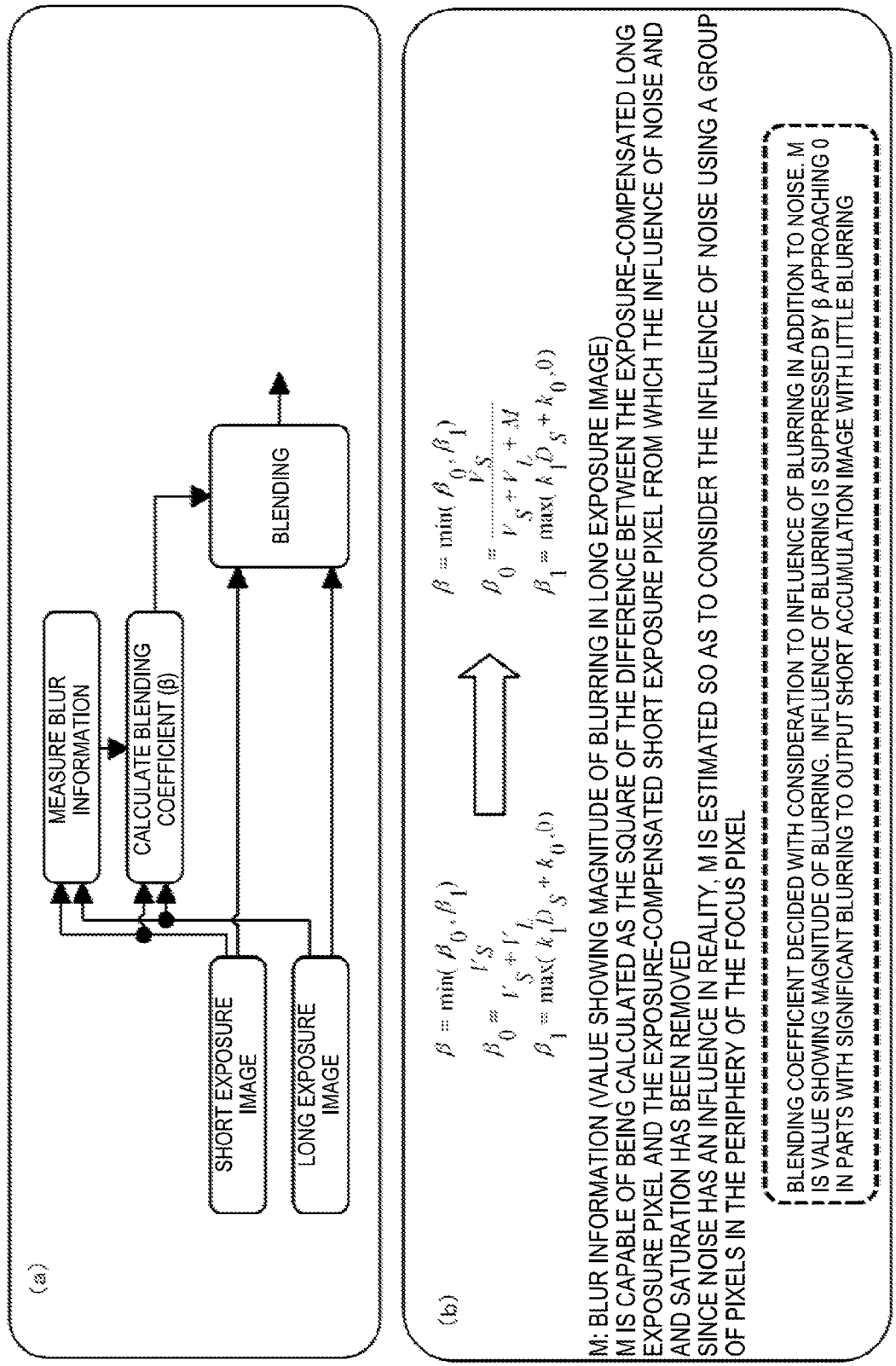
FIGS. 5A and 5B are diagrams useful in explaining an overview of a generation process for an HDR image according to processing of an embodiment of the present disclosure.

2. Example of Process Deciding the Blending Coefficient β in Processing According to an Embodiment of the Present Disclosure An example of a process deciding the blending coefficient β for a long exposure image and a short exposure image carried out by the image processing apparatus according to the present embodiment of the disclosure will now be described with reference to FIG. 5.

One example of a configuration of the blending process executed by the image processing apparatus according to the present embodiment is shown in FIG. 5A. In the processing according to the present embodiment, blur information is measured based on both the short exposure image and the long exposure image, the blending coefficient is decided based on the measured blur information and both the short exposure image and the long exposure image, and the blending process is carried out for the short exposure image and the long exposure image using the decided blending coefficient.

Note that as described earlier, the expression "blur" refers to a discrepancy in the pixel values of pixels at corresponding pixel positions in the long exposure image and the short exposure image that have been compensated based on the exposure ratio, and the "blur information" is an index value showing the degree of blurring corresponding to the discrepancy in the pixel values.

In the processing according to the present disclosure, "blur information" is acquired in single pixel units from the picked-up images, and by carrying out a blending process for the short exposure image and the long exposure image using a blending coefficient decided based on such acquired "blur information", an HDR image is generated.

In the configuration according to the present embodiment, a blending coefficient $\beta_B$ that takes blurring into consideration is calculated according to Equation 1 below, for example.

$$\beta_B = \min(\beta_0, \beta_1) \qquad \text{Equation 1}$$
$$\beta_0 = \frac{V_S}{V_S + V_L + M}$$
$$\beta_1 = \max(k_1 D_S + k_0, 0.0)$$

Here, "M" is the blur information (i.e., a degree of blurring index value showing the magnitude of blur), "max(a,b)" is a function that finds a maximum value of a and b, and "min(a,b)" is a function that finds a minimum value of a and b. Also, $k_1$ and $k_0$ are parameters that are described in detail later.

Note that "M", a value showing the magnitude of blurring of the long exposure image, is ideally calculated according to the equation below.

$$M = (\mu_L - \mu_S)^2$$

Here, "$\mu_L$" is an ideal pixel value of the exposure-compensated long exposure image obtained when noise has no influence whatsoever and "$\mu_S$" is an ideal pixel value of the exposure-compensated short exposure image obtained when noise has no influence whatsoever.

However, for the above equation, in reality noise will have an influence and it is not possible to directly find $\mu_L$ and $\mu_S$. For this reason, M is approximately found using Equation 2 for example, using a group of pixels in the periphery of the focus pixel.

$$M(x, y) = \sum_{dx,dy} \phi(dx, dy) \times \qquad \text{Equation 2}$$
$$\{D_L(x+dx, y+dy) - \min[D_S(x+dx, y+dy), 1023]\}^2 -$$
$$p \times V_S(x, y) - p \times V_L(x, y)$$

Here, "M(x,y)" is the blur information of the pixel position (x,y), $D_L(x,y)$ is a pixel value of the pixel position (x,y) in the exposure-compensated long exposure image, $D_S(x,y)$ is a pixel value of the pixel position (x,y) in the exposure-compensated long exposure image, $V_L(x,y)$ is a noise variance value at the pixel position (x,y) in the exposure-compensated long exposure image, $V_S(x,y)$ is a noise variance value at the pixel position (x,y) in the exposure-compensated long exposure image, $\phi(dx,dy)$ represents the weighting coefficient of a low pass filter, "min(a,b)" is a function that calculates a minimum value of the values a and b, "max(a,b)" is a function that calculates a maximum value of the values a and b, and "p" is an adjustment parameter that is a constant of zero or higher.

When, as the result of computation in Equation 2 described above, M(x,y) is a negative value, M(x,y) is replaced with zero. Alternatively, the calculation of M which shows the magnitude of blur in the long exposure image may be simplified and calculated according to Equation 3 below.

$$M(x, y) = \{D_{L\_LPF}(x, y) - D_{S\_LPF}(x, y)\}^2 - \qquad \text{Equation 3}$$
$$p \times V_S(x, y) - p \times V_L(x, y)$$
$$D_{L\_LPF}(x, y) = \sum_{dx,dy} \{\phi(dx, dy) \times D_L(x+dx, y+dy)\}$$
$$D_{S\_LPF}(x, y) = \sum_{dx,dy} \{\phi(dx, dy) \times \min[D_S(x+dx, y+dy), 1023]\}$$

The blending process is carried out by deciding the blending coefficient $\beta_B$ in this way. According to this process, in areas where there is significant blurring, a setting is used where $\beta_B$ is close to 0 so that pixel values based on the short exposure image that has little blurring are preferentially outputted, while in areas where there is little blurring, a setting is used where $\beta_B$ is the same as in existing methods so that pixel values are generated in keeping with a specified blending ratio. As a result of carrying out such processing, an HDR image in which a part including a moving subject has little blurring and a static part has a favorable S/N ratio from dark areas to light areas is obtained. Note that the calculation load of the blending coefficient described above is not great, which means that processing can be carried out at high speed. This enables the processing to be used even for an HDR image generating process for moving images, for example.

3. Example Configuration of Image Processing Apparatus

Figure 6:
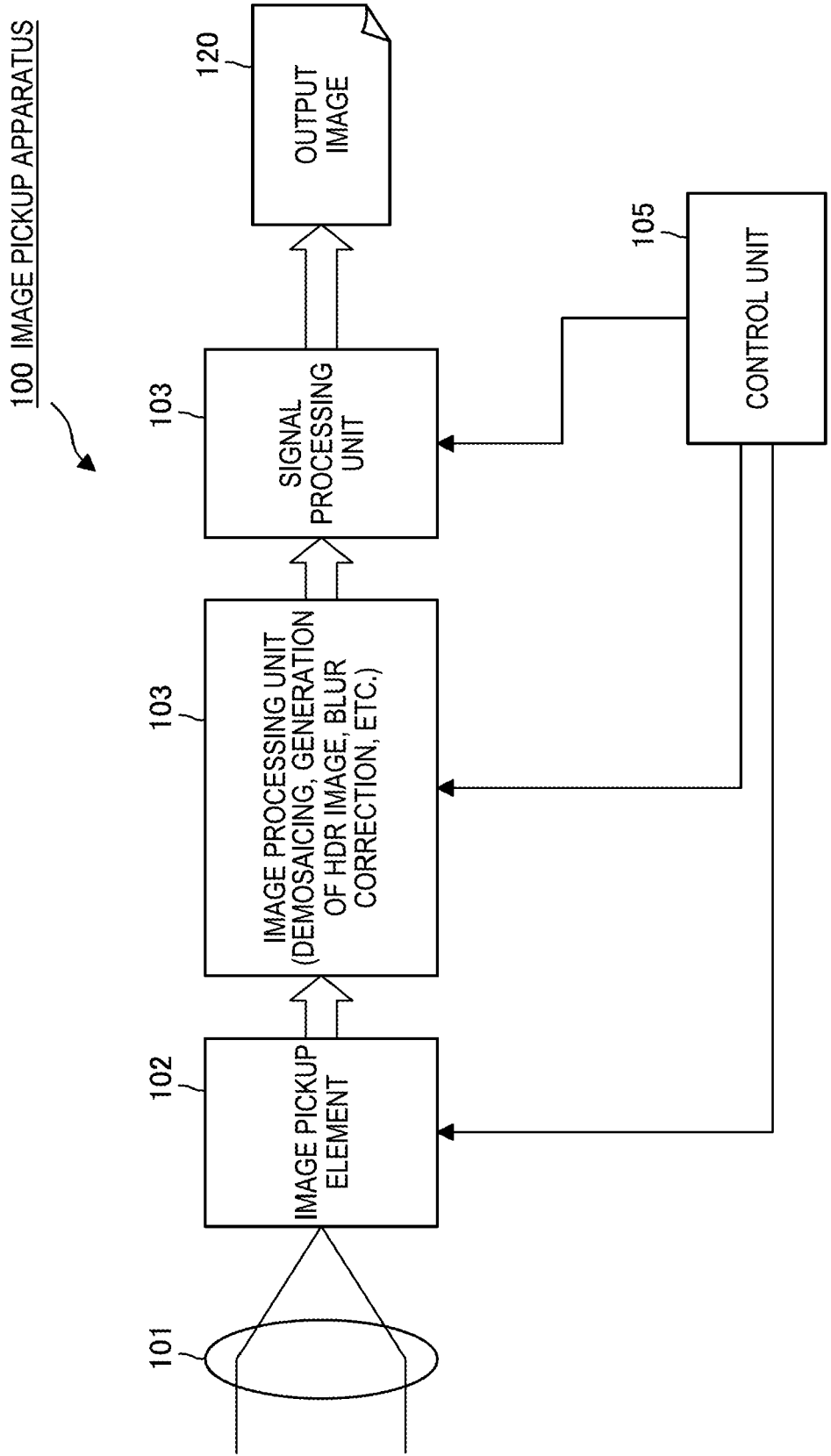
FIG. 6 is a diagram useful in explaining an example configuration of an image pickup apparatus.

FIG. 6 shows an example configuration of an image pickup apparatus 100 that is an example configuration of an image processing apparatus according to the present embodiment.

FIG. 6 is a block diagram showing an example configuration of the image pickup apparatus 100. Light incident via an optical lens 101 is incident on an image pickup element 102 constructed of an image pickup unit, such as a CMOS image sensor, is subjected to photoelectric conversion, and is then outputted as image data. The output image data is inputted into an image processing unit 103.

The output image of the image pickup element 102 is a so-called "mosaic image" where a pixel value of one of the colors RGB is set for each pixel. The image processing unit 103 carries out an HDR image generation process based on a demosaicing process setting RGB pixel values for each pixel and a blending process for the long exposure image and the short exposure image described earlier, in addition to a blur correction process and the like.

The output of the image processing unit 103 is inputted into a signal processing unit 104. The signal processing unit 104 generates an output image 120 by carrying out typical signal processing for a camera, such as white balance (WB) adjustment and gamma correction. The output image 120 is stored in a storage unit, not shown. Alternatively the output image 120 is outputted to a display unit.

The control unit 105 controls various processes by outputting control signals to various units in keeping with a program stored in a memory, not shown, for example.

4. Example of Exposure Control Configuration for Image Pickup Element

Next, an example of an exposure control configuration of the image pickup element 102 will be described with reference to FIG. 7. In the image processing apparatus according to the present embodiment, an HDR image is generated by setting long exposure pixels and short exposure pixels in units of pixels included in one picked-up image and carrying out a blending process for such pixels. Such exposure time control is carried out according to control by the control unit 105.

Figure 7:
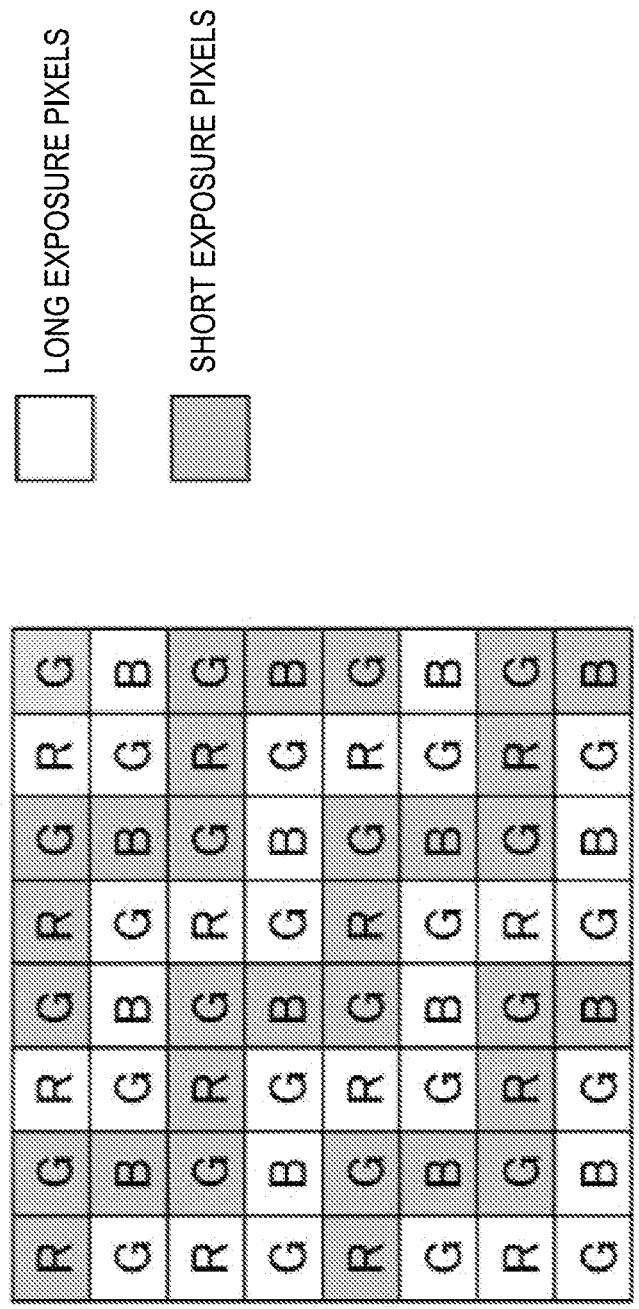
FIG. 7 is a diagram useful in explaining an exposure control process of an image pickup element.

FIG. 7 is a diagram showing example settings of exposure length by the image pickup element 102 according to the present embodiment of the disclosure. As shown in FIG. 7, the pixels that compose the image pickup element are classified into two types of pixels, namely "long exposure pixels" that perform image pickup with exposure conditions set at a long exposure and "short exposure pixels" that perform image pickup with exposure conditions set at a short exposure. For the present disclosure, a pixel pattern that includes long exposure pixels and short exposure pixels on a single image pickup element as shown in FIG. 7 is referred to as an SVE (Spatially Varying Exposure) pattern.

Figure 8:
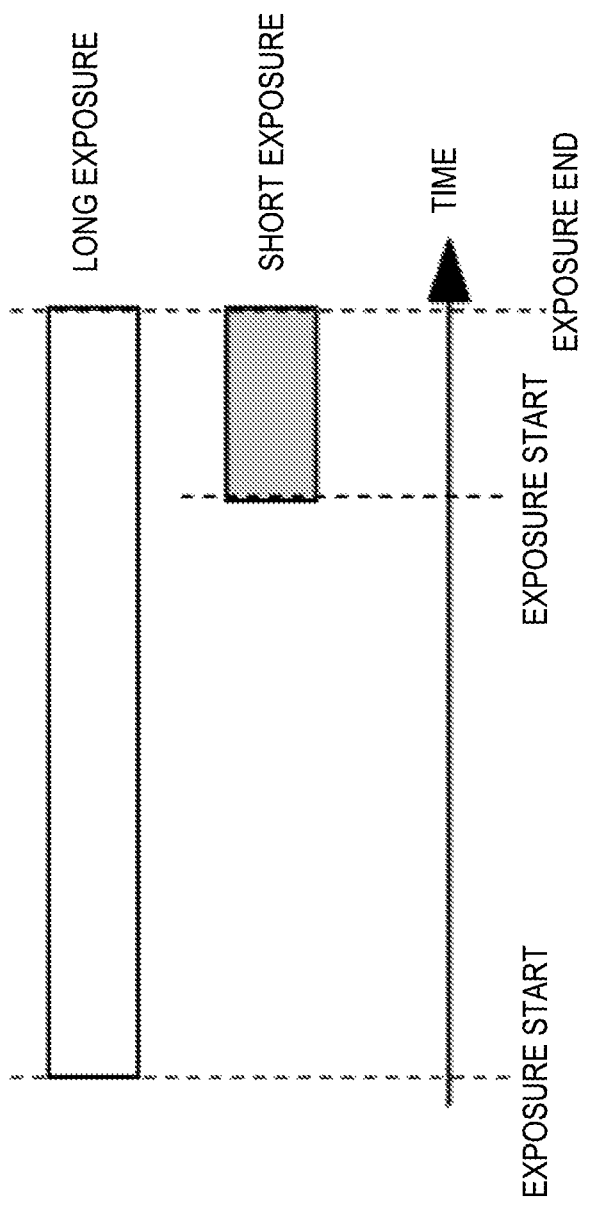
FIG. 8 is a diagram useful in explaining an exposure control process of the image pickup element.

FIG. 8 shows a timing example for the exposure lengths of respective pixels. A long exposure process is carried out at long exposure pixels and a short exposure process is carried out at short exposure pixels. Although the exposure start timing does not match for the short exposure pixels and the long exposure pixels in the example shown in FIG. 8, the exposure conditions are set so that the exposure end timing matches.

5. Details of Processing of Image Processing Unit

Figure 9:
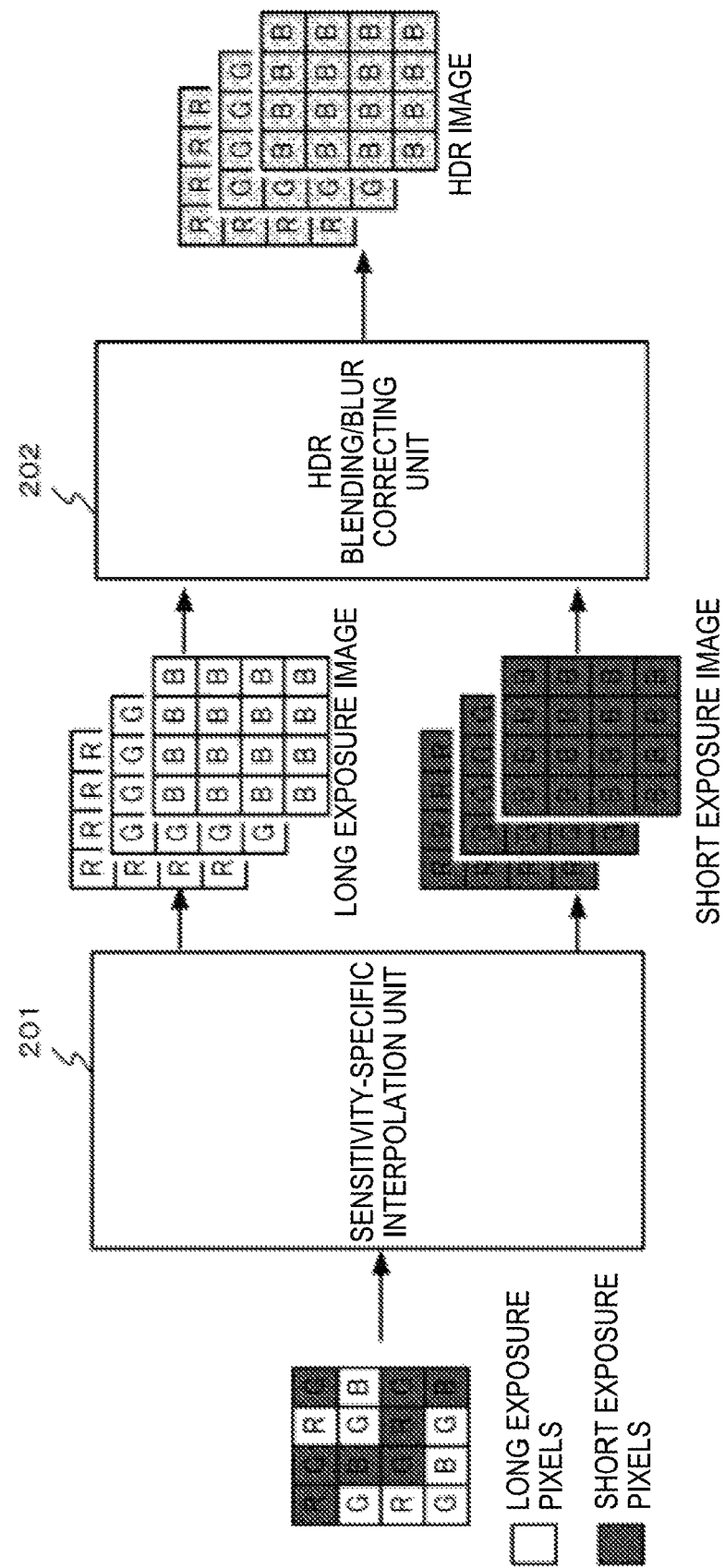
FIG. 9 is a diagram useful in explaining the configuration and processing of an image processing unit.

Next, the processing of the image processing unit 103 in the image pickup apparatus 100 shown in FIG. 6 will be described. First, the demosaicing process carried out by the image processing unit 103 will be described with reference to FIG. 9. As shown in FIG. 9, a demosaicing processing unit that constructs the image processing unit 103 includes a sensitivity-specific interpolation unit 201 and an HDR blending/blur correcting unit 202.

The sensitivity-specific interpolation unit 201 inputs an image of the SVE pattern that is a pixel pattern including long exposure pixels and short exposure pixels with the configuration shown in FIG. 7 for example, carries out an interpolation process on the inputted SVE pattern image to generate an image where the entire screen has a short exposure and an image where the entire screen has a long exposure, and outputs such interpolated images. The color patterns of the outputted images may be the same as the color pattern of the inputted image (in the present embodiment, a Bayer pattern), or the outputted images may be images after demosaicing to produce RGB values for each pixel position. The HDR blending/blur correcting unit 202 blends the short exposure image and the long exposure image to generate and output an HDR image with no blurring.

Figure 10:
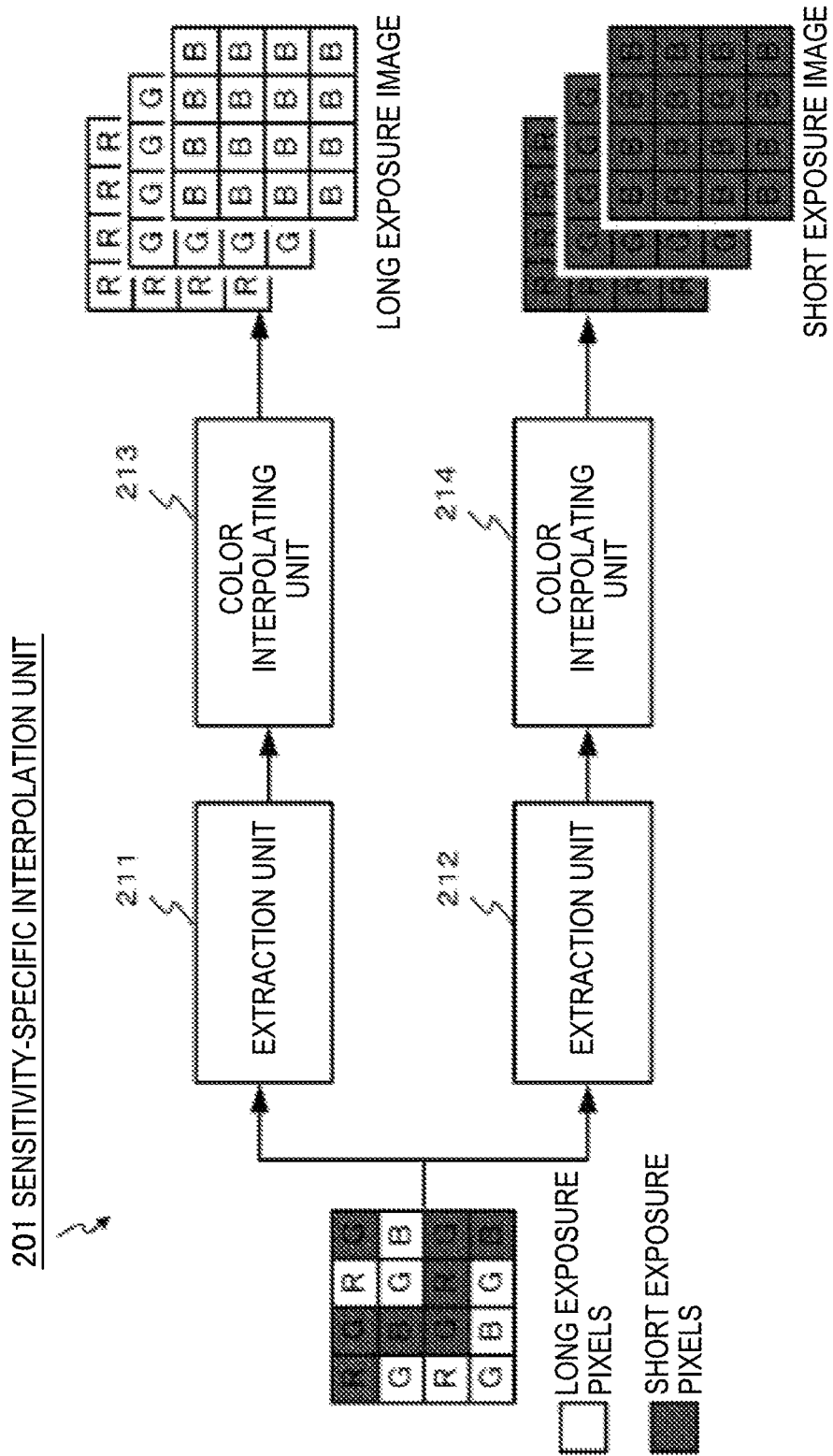
FIG. 10 is a diagram useful in explaining the configuration and processing of the image processing unit.

FIG. 10 shows the sensitivity-specific interpolation unit 201 in detail. As shown in FIG. 10, the sensitivity-specific interpolation unit 201 includes extraction units 211, 212 that extract only pixels of the respective sensitivities and color interpolating units 213, 214 that use the pixels of the respective sensitivities to generate a low sensitivity image (short exposure image) and a high sensitivity image (long exposure image). Note that as the interpolation processing configuration that corresponding to such sensitivities, it is possible to use the method in FIG. 74 of Japanese Laid-Open Patent Publication No. 2008-125117, for example. Pixels of the relevant sensitivity and color for interpolation are extracted from the peripheral pixels by the extraction units 211, 212 and an interpolation process is carried out by the color interpolating units 213, 214. Note that for the interpolation, as examples it is possible to use a method that uses a simple low-pass filter or a method that estimates the direction of an edge in the image from the peripheral pixels and interpolates along the direction of the edge.

Next, the configuration and processing of the HDR blending/blur correcting unit 202 will be described with reference to FIG. 11. The HDR blending/blur correcting unit 202 includes exposure compensation units (multiplier units) 221, 222, a blur information measuring unit 223, a blending coefficient calculating unit 224, and a blending unit 225.

The exposure compensation units (multiplier units) 221, 222 multiply by constants in keeping with the exposure lengths to match the brightness of the short exposure image and the long exposure image. In the present embodiment, since the exposure ratio is 16, the short exposure image is multiplied by 16 and the long exposure image is multiplied by 1. The blur information measuring unit 223 measures the blur information (showing the degree of blurring for the long exposure image) for each pixel. The expression "blur information" is a value corresponding to M, the value showing the magnitude of blurring of the long exposure image described earlier with reference to Equation 1 to Equation 3. The blending coefficient calculating unit 224 calculates the blending coefficient showing the proportions for blending the exposure-compensated short exposure image and the exposure-compensated long exposure image. The blending unit 225 blends the exposure-compensated short exposure image and the exposure-compensated long exposure image in keeping with the blending coefficient.

The detailed configuration and processing of the blur information measuring unit 223 will now be described with reference to FIG. 12. The blur information measuring unit 223 includes single color blur information measuring units 241 to 243 and a maximum value selecting unit 244.

The blur information measuring unit 223 inputs the exposure-compensated short exposure image and the exposure-compensated long exposure image in which the three colors RGB have been set for each pixel position by the demosaicing process and which have been subjected to exposure compensation.

An exposure-compensated long exposure image 230RL and an exposure-compensated short exposure image 230RS for red (R) are inputted into the single color blur information measuring unit 241. An exposure-compensated long exposure image 230GL and an exposure-compensated short exposure image 230GS for green (G) are inputted into the single color blur information measuring unit 242. An exposure-compensated long exposure image 230BL and an exposure-compensated short exposure image 230BS for blue (B) are inputted into the single color blur information measuring unit 243. Blur information is measured corresponding to the respective colors R, G, and B by the single color blur information measuring units 241 to 243. The expression "blur information" is a value corresponding to M, the value showing the magnitude of blurring of the long exposure image described earlier with reference to Equation 1 to Equation 3, and the single color blur information measuring units 241 to 243 calculate the blur information $M_R$, $M_G$, $M_B$ for the respective colors R, G, and B at each pixel position.

In addition, the blur information $M_R$, $M_G$, and $M_B$ for the respective colors R, G, and B at each pixel position calculated by the single color blur information measuring units 241 to 243 are inputted into the maximum value selecting unit 244. In the maximum value selecting unit 244, the respective blur information $M_R$, $M_G$, and $M_B$ at each pixel position are compared and a maximum value out of the blur information for the respective colors is selected at each pixel position and outputted.

The detail configuration and processing of the single color blur information measuring units 241 to 243 will now be described with reference to FIG. 13. The single color blur information measuring units 241 to 243 calculate blur information for the respective colors. Here, the processing configuration of the single color blur information measuring unit 241 shown in FIG. 12 that calculates the R single color blur information ($M_R$) will be described. The other single color blur information measuring units 242 and 243 have the same configuration.

Figure 13:
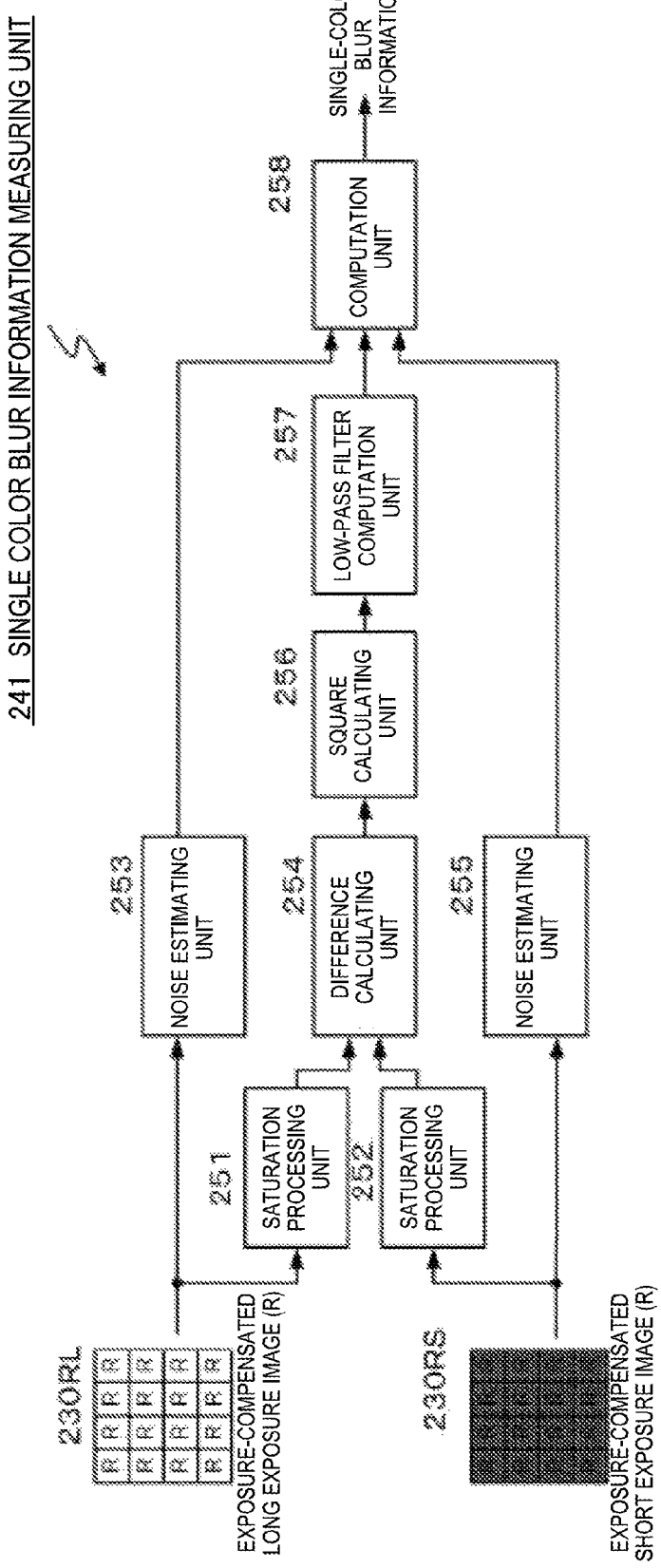
FIG. 13 is a diagram useful in explaining the configuration and processing of the image processing unit.

As shown in FIG. 13, the single color blur information measuring unit 241 includes saturation processing units 251, 252, noise estimating units 253, 255, a difference calculating unit 254, a square calculating unit 256, a low-pass filter computation unit 257, and a computation unit 258.

The single color blur information measuring unit 241 uses a set of pixels in the periphery of the focus pixel in the same way as the calculation process according to Equation 2 described above to approximately find the R single color blur information ($M_R$) using Equation 4 below, for example.

$$M_R(x, y) = \sum_{dx,dy} \phi(dx, dy) \times \left\{ \begin{array}{c} D_{RL}(x + dx, y + dy) - \\ \min[D_{RS}(x + dx, y + dy), 1023] \end{array} \right\}^2 - \quad \text{Equation 4}$$

$$p \times V_{RL}(x, y) - p \times V_{RS}(x, y)$$

Note that if the value of $M_R$ calculated by Equation 4 above is a negative value, such value is replaced with zero. Here, the respective variables in Equation 4 are as follows. The R pixel value of an exposure-compensated long exposure pixel at the position (x,y) after saturation processing is $D_{RL}(x,y)$, R pixel value of an exposure-compensated short exposure pixel at the position (x,y) after saturation processing is $D_{RS}(x,y)$, a kernel of the low-pass filter is $\phi(x,y)$, R noise variance of an exposure-compensated long exposure pixel at the position (x,y) is $V_{RL}(x,y)$, and R noise variance of an exposure-compensated short exposure pixel at the position (x,y) is $V_{RS}(x,y)$.

The noise estimating units 253, 255 estimate noise variance values of pixels after exposure compensation at the focus pixel position. Typically, the pixel value outputted by an image sensor and the variance value of the noise at such pixel are modeled as follows.

$$\text{Noise variance} = n_1 \times \text{pixel value} + n_0$$

In this equation, $n_1$ and $n_0$ are constants in keeping with the sensor and the sensitivity. In this example, since a pixel value $D_L$ in the exposure-compensated long exposure image is produced by multiplying a pixel value outputted by the sensor by one and a pixel value $D_S$ in the exposure-compensated short exposure image is produced by multiplying a pixel value outputted by the sensor by the exposure ratio E, as a specific example it is possible to calculate the noise variance $V_L(x,y)$ of the exposure-compensated long exposure image and the noise variance $V_S(x,y)$ of the exposure-compensated short exposure image at the focus position (x,y) by using the equations below.

$$V_L(x, y) = (n_1 \times D_L(x, y) + n_0)$$
$$V_S(x, y) = (n_1 \times (D_S(x, y) \div E) + n_0) \times E^2$$
$$= n_1 \times E \times D_S(x, y) + n_0 \times E^2$$

Note that as described below, for the noise variance mentioned above, the noise variance calculation process is carried out separately for the respective colors R, G, and B to calculate the noise variance $V_{RL}(x,y)$ corresponding to R in the exposure-compensated long exposure image, the noise variance $V_{RS}(x,y)$ corresponding to R in the exposure-compensated short exposure image, the noise variance $V_{GL}(x,y)$ corresponding to G in the exposure-compensated long exposure image, the noise variance $V_{GS}(x,y)$ corresponding to G in the exposure-compensated short exposure image, the noise variance $V_{BL}(x,y)$ corresponding to B in the exposure-compensated long exposure image, and the noise variance $V_{BS}(x,y)$ corresponding to B in the exposure-compensated short exposure image.

The saturation processing units 251, 252 replace values that are equal to or above a threshold with such threshold to set matching saturation levels for the short exposure image and the long exposure image that have been subjected to exposure compensation. In the present embodiment, since the saturation pixel value of the long exposure image after exposure compensation is 1023, all values equal to or above 1023 are replaced with 1023 in both the exposure-compensated long exposure image and the exposure-compensated short exposure image.

In a block including the difference calculating unit 254, the square calculating unit 256, and the low-pass filter computation unit 257, a value corresponding to the former half of Equation 4, that is, the value shown in Equation 5 below is calculated.

$$\sum_{dx,dy} \phi(dx, dy) \times$$

$$\{D_L(x + dx, y + dy) - \min[D_S(x + dx, y + dy), 1023]\}^2$$

Equation 5

Note that the calculation in Equation 5 given above is influenced by the noise included in the exposure-compensated long exposure pixel and the exposure-compensated short exposure pixel. Here, it is desirable to find the influence due purely to blurring. For this reason, the computation unit 258 carries out a process that subtracts the noise variance. The process that subtracts the noise variance corresponds to the subtraction in the latter half of Equation 4 described above, that is, $$(-P \times V_{RL}(x,y) - P \times V_{RS}(x,y))$$

given above. As a result, it is possible to calculate the R single color blur information ($M_R$) as the calculation result of Equation 4 described earlier. Note that since the blur information M cannot take a negative value, if the value of $M_R$ calculated according to Equation 4 described above is a negative value, such value is replaced with zero.

Figure 14:
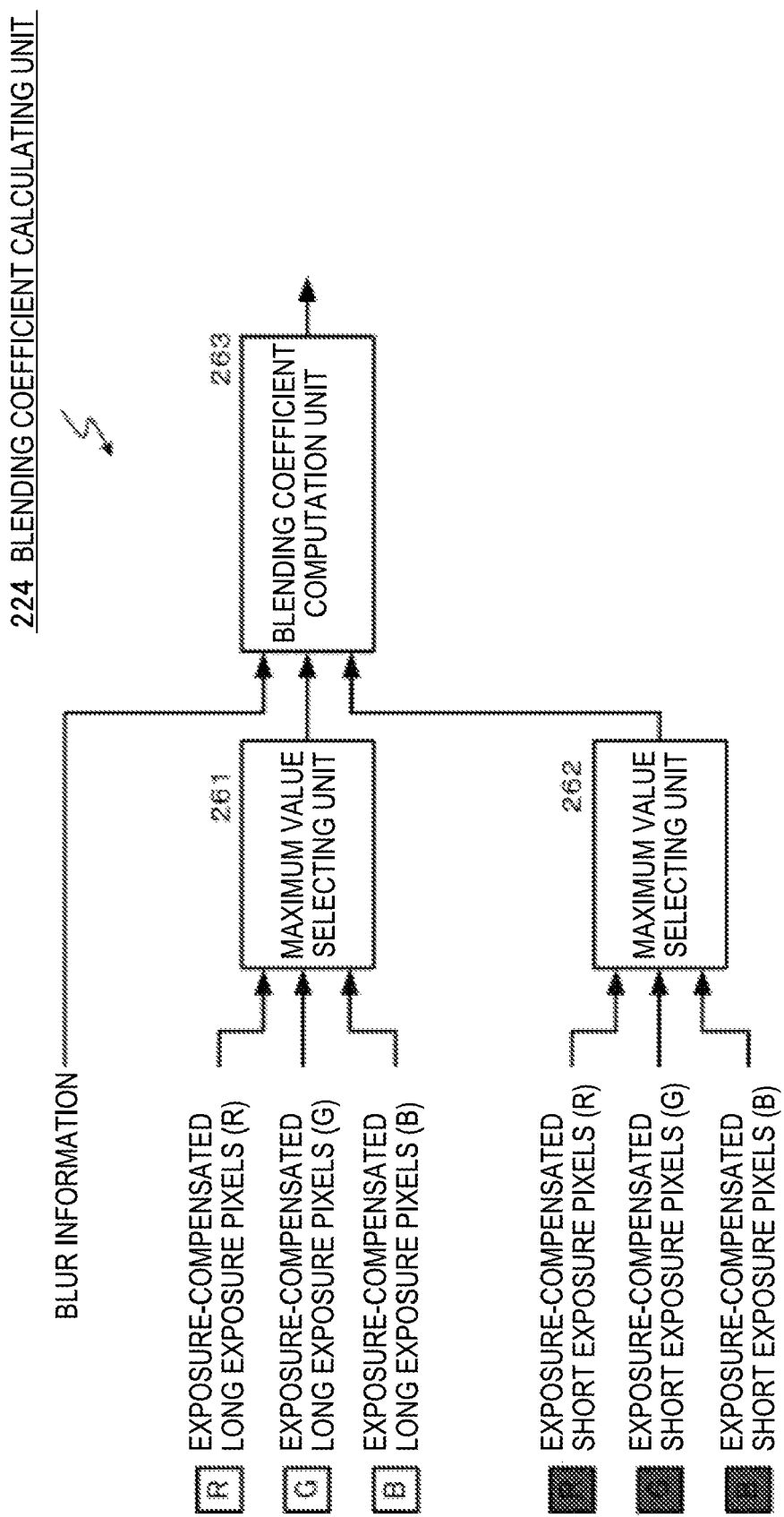
FIG. 14 is a diagram useful in explaining the configuration and processing of the image processing unit.

Next, an example configuration of the blending coefficient calculating unit 224 of the HDR blending/blur correcting unit 202 shown in FIG. 11 will be described with reference to FIG. 14. As shown in FIG. 14, the blending coefficient calculating unit 224 includes maximum value selecting units 261 and 262 and a blending coefficient computation unit 263.

The blending coefficient calculating unit 224 inputs images in which the three colors R, G and B are provided for each pixel position, specifically the exposure-compensated long exposure image and the exposure-compensated short exposure image corresponding to the RGB colors, and successively inputs the R, G, and B pixel value information of the same position into the maximum value selecting units 261, 262.

The maximum value selecting unit 261 selects a maximum value out of the RGB pixel values at a corresponding pixel position in the respective RGB exposure-compensated long exposure images. In the same way, the maximum value selecting unit 262 selects a maximum value out of the RGB pixel values at a corresponding pixel position in the respective RGB exposure-compensated short exposure images.

Figure 11:
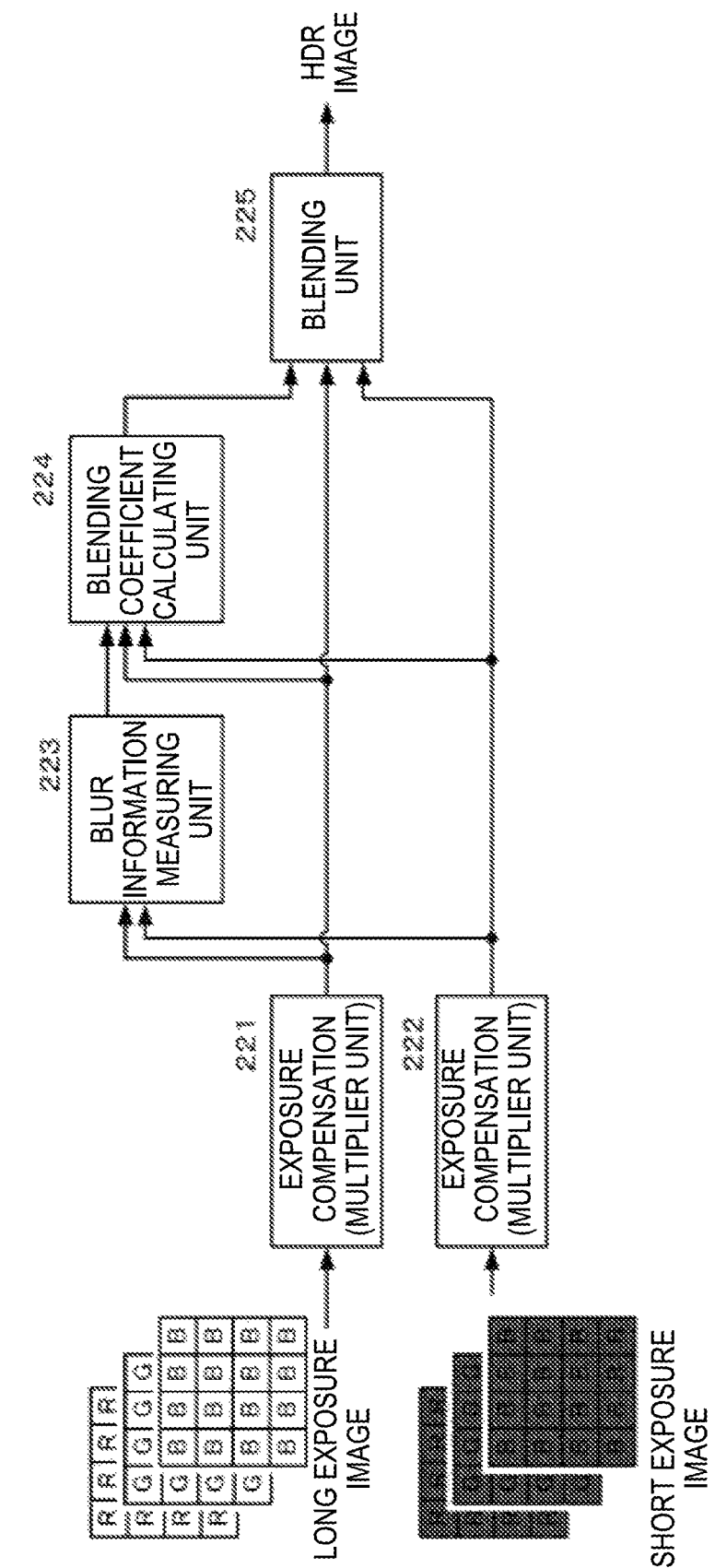
FIG. 11 is a diagram useful in explaining the configuration and processing of the image processing unit.
Figure 12:
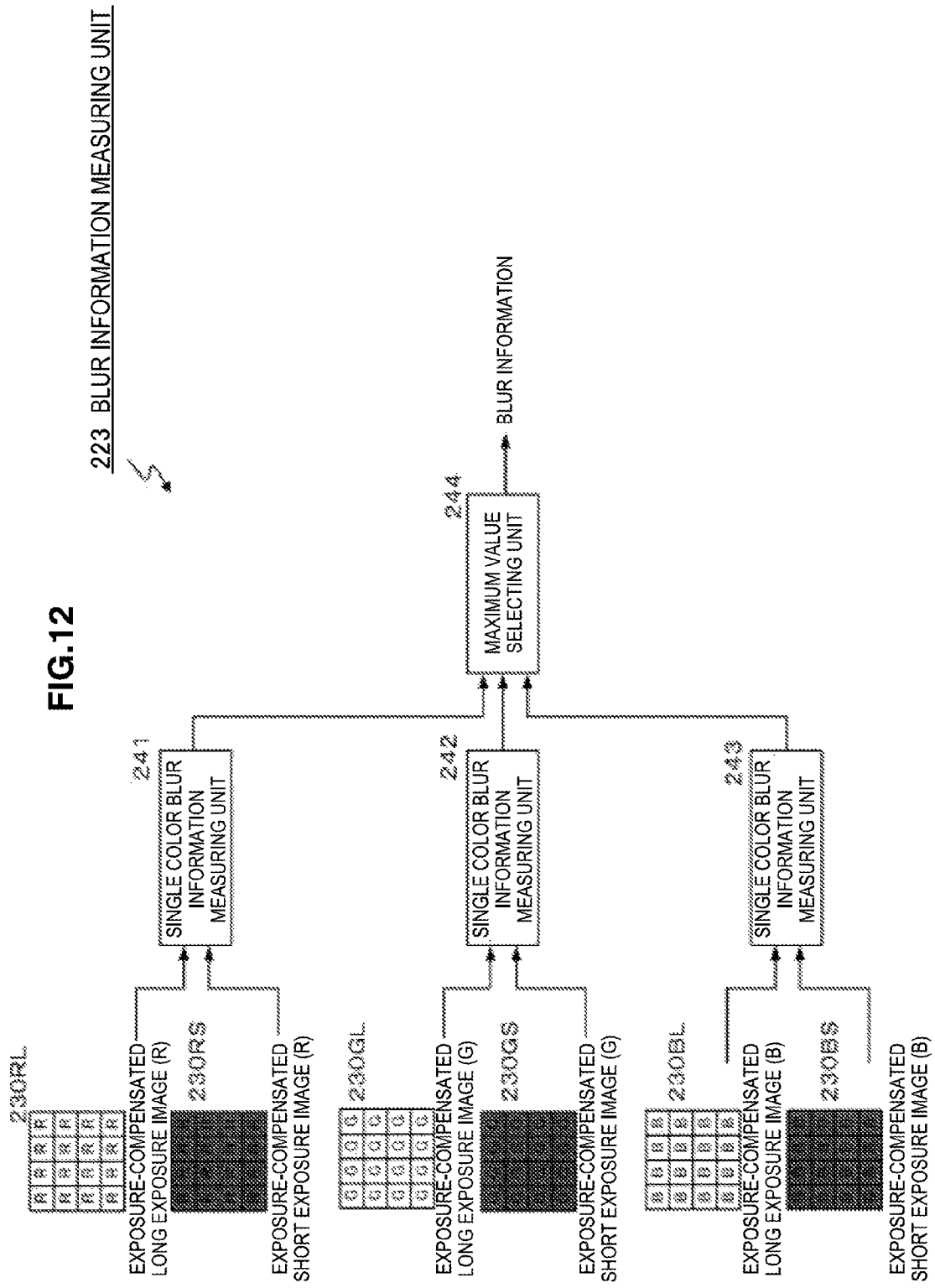
FIG. 12 is a diagram useful in explaining the configuration and processing of the image processing unit.

The blending coefficient computation unit 263 inputs the maximum value out of the RGB pixel values at the corresponding pixel position in the RGB exposure-compensated long exposure images from the maximum value selecting unit 261, inputs the maximum value out of the RGB pixel values at the corresponding pixel position in the RGB exposure-compensated short exposure images from the maximum value selecting unit 262, and also inputs the blur information of the respective pixel positions from the blur information measuring unit 223 that was described with reference to FIGS. 11 to 13. The blending coefficient computation unit 263 calculates the blending coefficient based on such input information.

The blending coefficient computation unit 263 calculates the actual blending coefficient, that is, a blending coefficient showing the blending ratio of the exposure-compensated short exposure image and the exposure-compensated long exposure image for each pixel. Note that the exposure-compensated short exposure image and the exposure-compensated long exposure image are blended using a blending coefficient that is common to R, G, and B.

Figure 15:
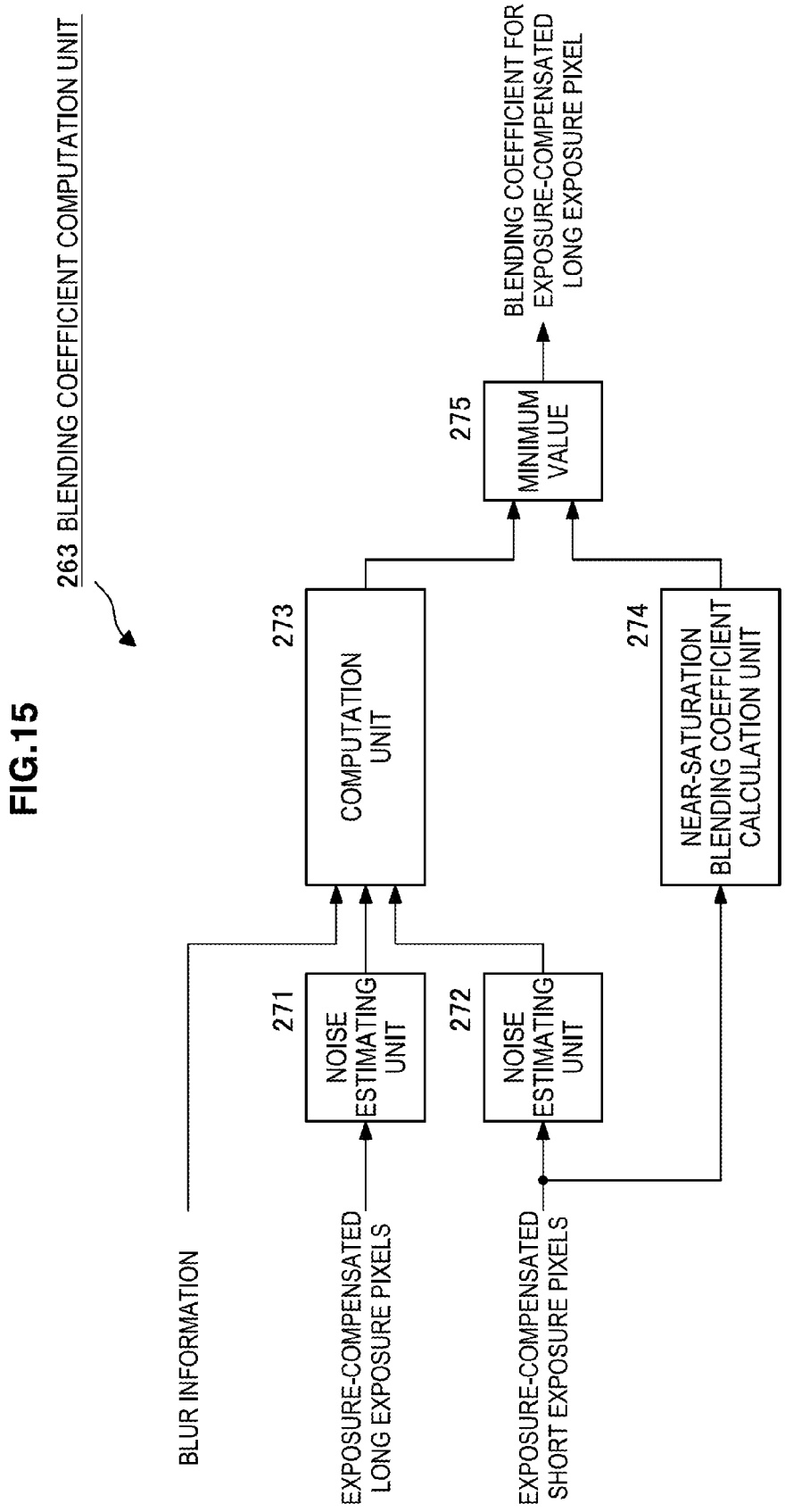
FIG. 15 is a diagram useful in explaining the configuration and processing of the image processing unit.

The detailed configuration and processing of the blending coefficient computation unit 263 will now be described with reference to FIG. 15. As shown in FIG. 15, the blending coefficient computation unit 263 includes noise estimating units 271, 272, a computation unit 273, a near-saturation blending coefficient calculation unit 274, and a minimum value selecting unit 275.

The noise estimating units 271, 272 estimate the variance values for noise after exposure compensation. Such noise estimating units 271, 272 carry out the same processing as the noise estimating units 253, 255 in the single color blur information measuring unit 241 described earlier with reference to FIG. 13. That is, the noise estimating units 271, 272 estimate noise variance values of pixels after exposure compensation at the focus pixel position. As described earlier, the noise variance $V_L(x,y)$ in the exposure-compensated long exposure image and the noise variance $V_S(x,y)$ in the exposure-compensated short exposure image of the focus pixel (x,y) are calculated according to the equations below.

$$V_L(x, y) = (n_1 \times D_L(x, y) + n_0)$$

$$V_S(x, y) = (n_1 \times (D_S(x, y) \div E) + n_0) \times E^2$$

$$= n_1 \times E \times D_S(x, y) + n_0 \times E^2$$

where $D_L$ is a pixel value of an exposure-compensated long exposure pixel, $D_S$ is a pixel value of an exposure-compensated short exposure pixel, E is the exposure ratio between short exposure and long exposure, and $n_1$ and $n_0$ are constants in keeping with the sensor and the sensitivity.

According to the calculation below, the computation unit 273 calculates the blending coefficient calculating value βp to be used when calculating the final blending coefficient β.

$$\beta p = (V_S)/(V_S + V_L + M)$$

where $V_L$ is the noise variance of the exposure-compensated long exposure image, $V_S$ is the noise variance of the exposure-compensated short exposure image, and M is the blur information.

Note that to reduce the load of the division, it is possible to use a process that approximately calculates the division given above. Alternatively, a look up table (LUT) in which input and output values of the division given above are registered in advance may be stored in a storage unit and the calculation may be simplified by using a process that refers to the LUT.

Note that for a condition where a long exposure pixel is saturated, it is desirable to set the blending coefficient β at 0 and output an exposure-compensated short exposure pixel. For this reason, in the near-saturation blending coefficient calculation unit 274, a broken line such as the graph shown in FIG. 16 is used so that in a vicinity of where the long exposure pixels become saturated, the blending coefficient calculating value βp is calculated in order to adjust the blending coefficient β.

Figure 16:
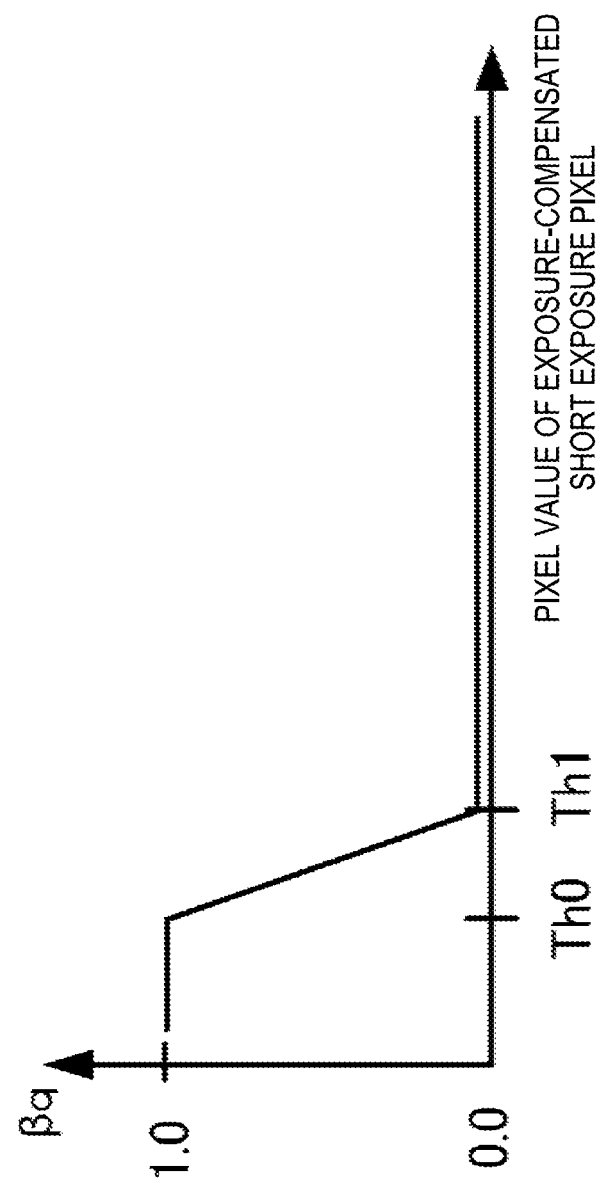
FIG. 16 is a diagram useful in explaining the configuration and processing of the image processing unit.

The graph shown in FIG. 16 is a graph that has a pixel value of an exposure-compensated short exposure pixel on the horizontal axis and the blending coefficient calculating value βq used to calculate the final blending coefficient β on the vertical axis. Two thresholds Th0 and Th1 are set for the pixel value of the exposure-compensated short exposure pixel on the horizontal axis so that $$0 < Th0 < Th1$$

Values that satisfy this relationship are used as the thresholds Th0 and Th1. As examples, the threshold Th1 is a pixel value of an exposure-compensated short exposure pixel for which the estimated pixel value of the corresponding exposure-compensated long exposure pixel will be a substantially 100% saturated pixel value and the threshold Th0 is a pixel value of an exposure-compensated short exposure pixel with increased probability of the pixel value of the corresponding long exposure pixel being a saturated pixel value.

As shown in FIG. 16, the blending coefficient calculating value βq is set so that βq=1 when the pixel value of an exposure-compensated short exposure pixel is 0 to Th0, βq=1 to 0 when the pixel value of an exposure-compensated short exposure pixel is Th0 to Th1, and βq=0 when the pixel value of an exposure-compensated short exposure pixel is higher than Th1. In the present embodiment, since the saturation pixel value of the exposure-compensated long exposure image is 1023, Th1 is set at a parameter that is lower than 1023 and Th0 at a parameter with a lower value than Th1.

The minimum value selecting unit 275 selects a minimum value out of the two blending coefficient calculating values βp, βq, that is, (a) the blending coefficient calculating value βp calculated by the computation unit 273 so that $βp=(V_S)/(V_S+V_L+M)$ and (b) the blending coefficient calculating value βq calculated by the near-saturation blending coefficient calculation unit 274, that is, the blending coefficient calculating value βq with the setting shown in FIG. 16.

Note that the equation for calculating the blending coefficient β by the minimum value selecting unit 275 can be expressed as Equation 6 below.

$$β = \min(β_p, β_q) \quad \text{Equation 6}$$

Figure 17:
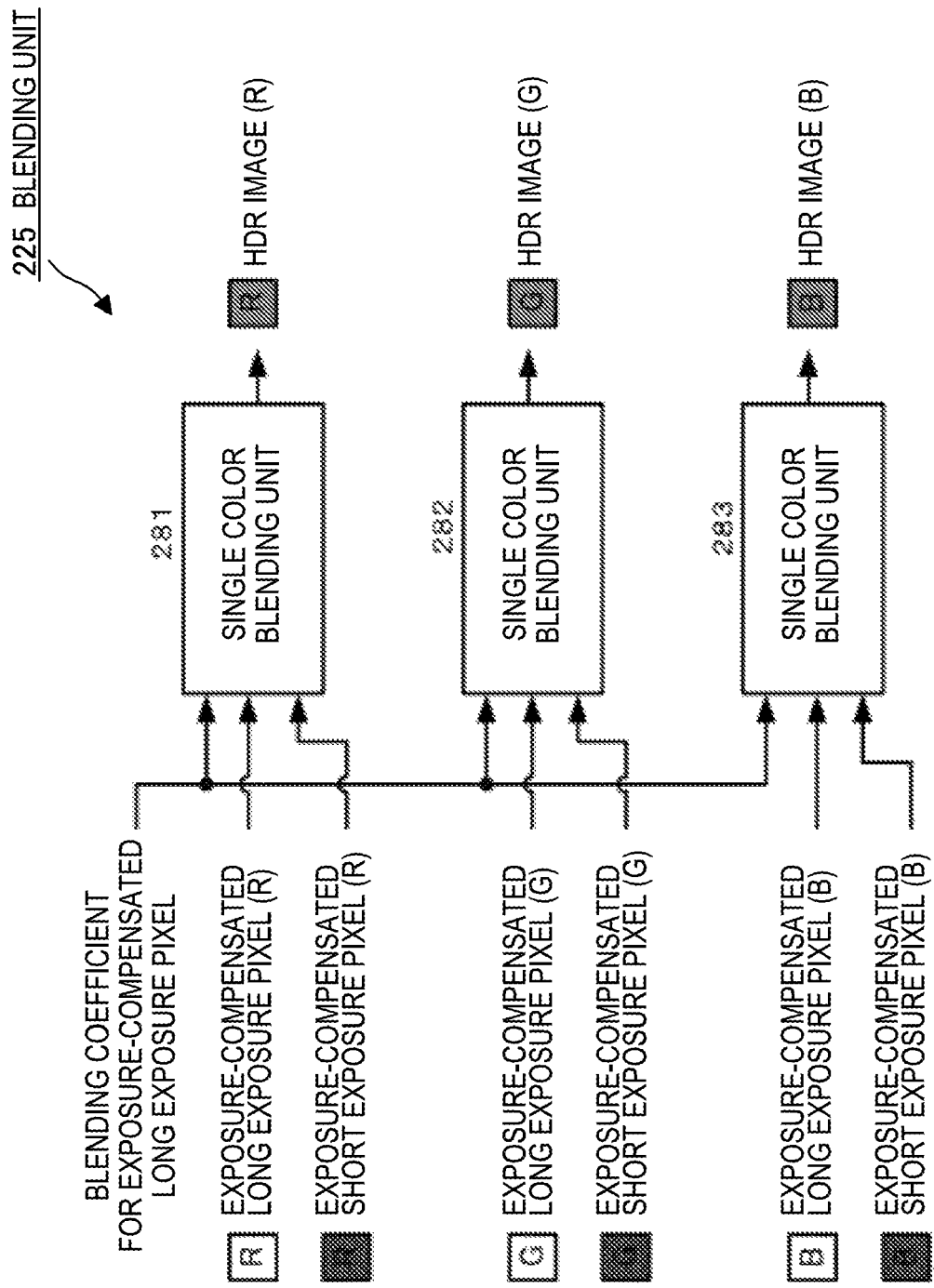
FIG. 17 is a diagram useful in explaining the configuration and processing of the image processing unit.

Next, an example configuration of the blending unit 225 of the HDR blending/blur correcting unit 202 shown in FIG. 11 will be described with reference to FIG. 17. As shown in FIG. 17, the blending unit 225 includes single color blending units 281, 282, and 283.

The single color blending units 281 to 283 carry out a blending process on corresponding pixels out of the short exposure pixels and the long exposure pixels for the colors R, G, and B using the decided blending coefficient β to obtain an HDR image. As the blending coefficients for R, G and B, a common value is used for each pixel.

Figure 18:
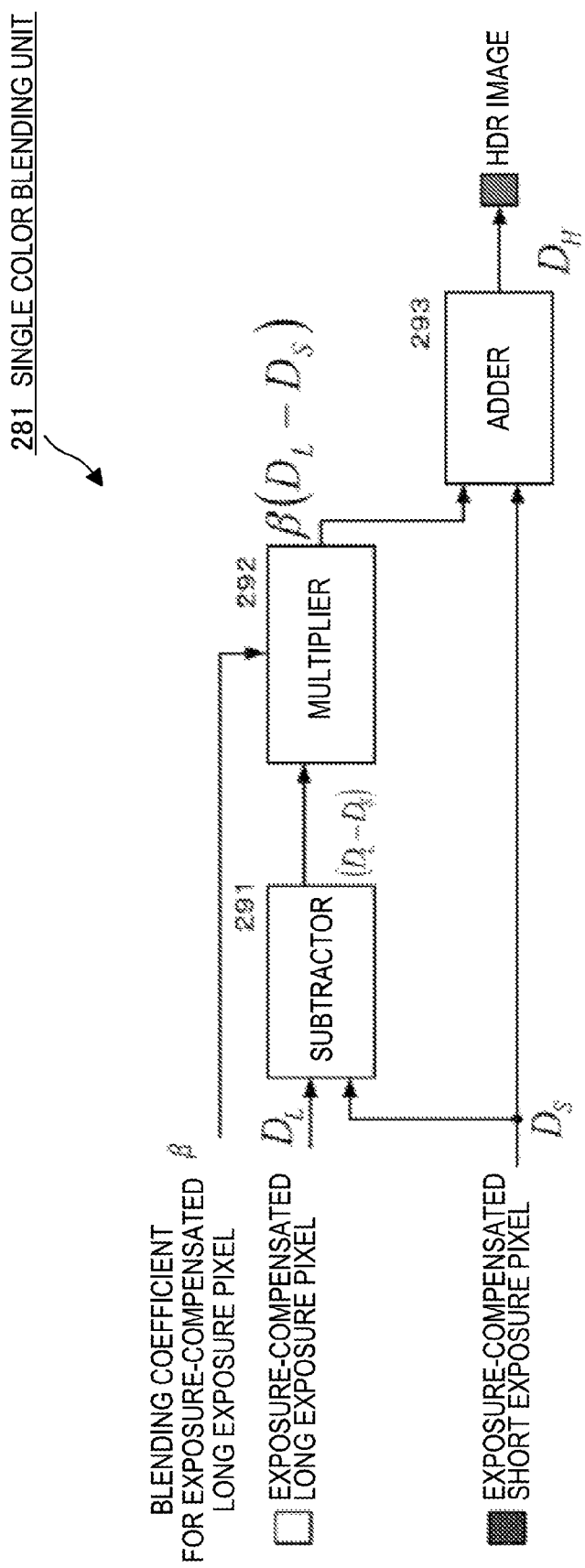
FIG. 18 is a diagram useful in explaining the configuration and processing of the image processing unit.

The detailed configuration and processing of the single color blending units 281, 282, and 283 will now be described with reference to FIG. 18. FIG. 18 shows the configuration of the single color blending unit 281. The single color blending units 282 and 283 also have the same configuration. As shown in FIG. 18, the single color blending unit 281 includes a subtractor 291, a multiplier 292, and an adder 293.

In the single color blending unit 281, the pixel value $D_H$ of the HDR image to be outputted is calculated according to the equation below.

$$D_H = (1 - β) \times D_S + β \times D_L$$
$$= β \times (D_L - D_S) + D_S$$

where $D_L$ is a pixel value in an exposure-compensated long exposure image, $D_S$ is a pixel value in an exposure-compensated short exposure image, and β is the blending coefficient. As a result of the blending process according to the above equation, pixel values of an HDR image are obtained.

6. Other Embodiments

A specific embodiment of an image processing apparatus has been described above. Other embodiments that have partial changes to the basic configuration of the embodiment described above will now be described.

(6-1) Embodiment in which Calculation of Blur Information is Simplified

An embodiment in which the calculation of blur information is simplified will now be described. In the basic embodiment described earlier, the blur information in the units of the respective RGB colors is calculated as the calculation process of the blur information M according to Equation 4 described earlier.

In place of the calculation described above, it is possible to suppress the cost of multipliers or memory by first carrying out processing using a low-pass filter (LPF) or calculation that is the equivalent to use of an LPF. By first carrying out processing using a low-pass filter (LPF) or carrying out calculation that is the equivalent to use of an LPF, since pixel values that have been subjected to an LPF are set as the addition result of a plurality of peripheral pixels, the influence of noise is suppressed and it is possible to omit the process that subtracts the noise variance $V_L$ and $V_S$ from the exposure-compensated long exposure image and the exposure-compensated short exposure image. For example, as the calculation process of the blur information $M_R$ corresponding to R, it is possible to use the calculation equation below (Equation 7).

$$M_R = [\min(φ(x,y)*D_{RL}(x,y), 1023) - \min(φ(x,y)*D_{RS}(x,y), 1023)]^2 \quad \text{Equation 7}$$

Figure 19:
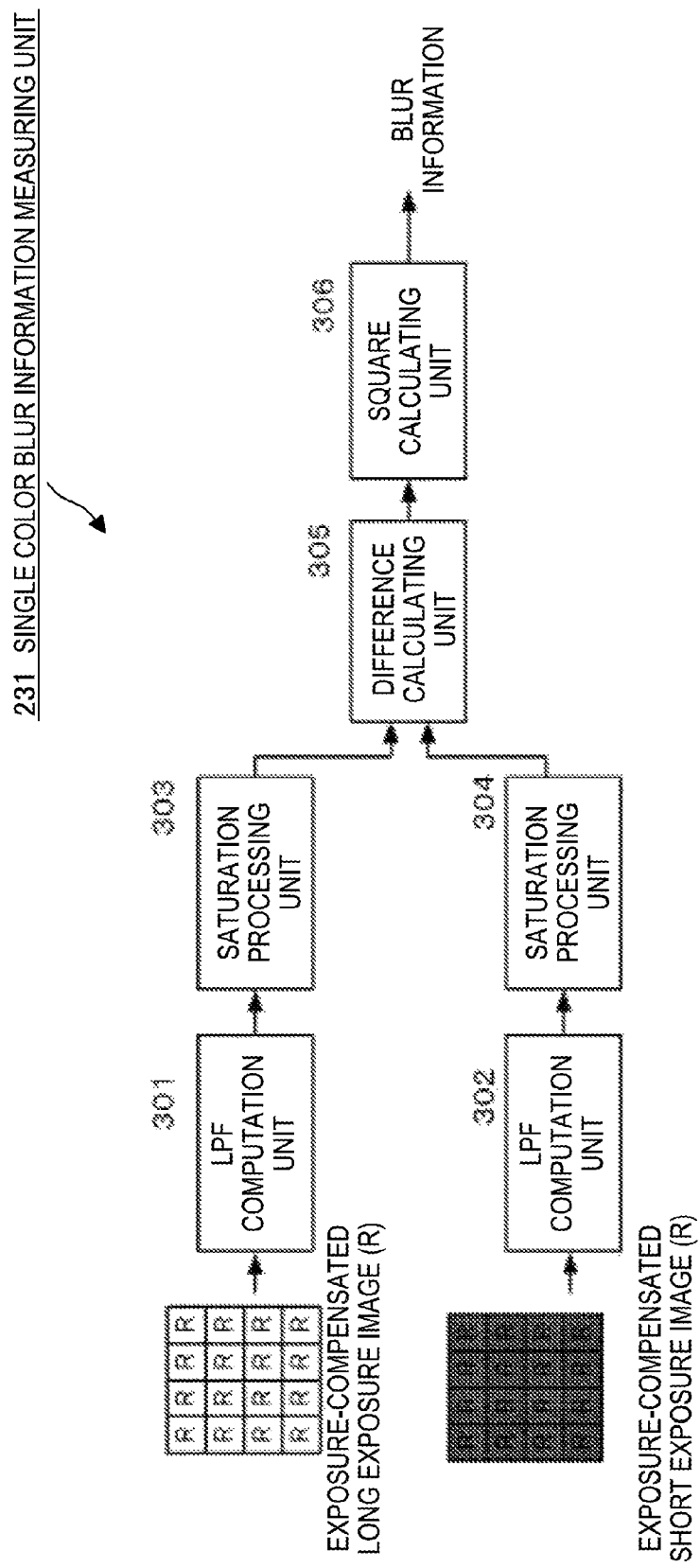
FIG. 19 is a diagram useful in explaining the configuration and processing of the image processing unit.

An example configuration of the single color blur information measuring unit 231 that carries out a calculation process for blur information according to Equation 7 given above is shown in FIG. 19. The single color blur information measuring unit 231 shown in FIG. 19 includes LPF 301, 302, saturation processing units 303, 304, a difference calculating unit 305, and a square calculating unit 306, and executes a calculation process for the blur information M according to Equation 7 described above via the processing of such units.

6-2. Example of Processing Carrying Out an Interpolation Process on a Bayer Pattern The basic embodiment described above is constructed to produce the three RGB colors for each pixel in the sensitivity-specific interpolation unit. In this way, without setting the three colors, it is possible to carry out the present process if the short exposure image and the long exposure image are interpolated to images with the same color pattern. For example, in the present embodiment, it is also possible to carry out processing that interpolates to the same color pattern (Bayer pattern) as the image sensor that inputs the image.

In this case, since the color differs on a pixel-by-pixel basis, it is necessary to extract pixels with the same color as the focus pixel from the peripheral pixels and carry out low pass filter computation using a low-pass filter computation unit or the like of the blur information measuring unit. The basic configuration here is the same as in the basic embodiment described earlier.

6-3. Pixel Pattern of Image Pickup Element

Although a processing example for the output from an image pickup element with a Bayer pattern has been described in the above embodiment, the processing according to the present disclosure is not limited to a Bayer pattern and can also be applied to images with a variety of other pixel patterns. For example, processing can be carried out on the various pixel patterns shown in FIG. 20A to FIG. 20J.

6-4 Example Using an Image Sensor without an SVE Pattern

Aside from an image sensor with an SVE pattern, the processing according to the present disclosure can use images (such as a short exposure and a long exposure) acquired by image pickup multiple times by a normal image sensor or can use images picked up using a plurality of image sensors. In such case, since there is the possibility of the subject position shifting between the short exposure image and the long exposure image, it is also possible to use a position correcting unit to perform correction to align the positions of the subject in advance.

7. Processing Sequence of Image Processing Apparatus

Next, the sequence of image processing carried out by the image processing apparatus according to an embodiment of the present disclosure will be described with reference to the flowchart shown in FIG. 21.

The processing in the steps in the flowchart shown in FIG. 21 will now be described. As one example, the flow shown in FIG. 21 is processing carried out by the image processing unit 103 in the image pickup apparatus 100 shown in FIG. 6 and is carried out using a processor or hardware as a data processing unit inside the image processing unit 103 according to a program stored in a storage unit inside the image processing unit 103.

Note that in the flow shown in FIG. 21 is processing carried out in pixel units by the image processing unit 103 sequentially inputting pixel value information that composes an image picked up by the image pickup element 102 of the image pickup apparatus 100 shown in FIG. 6. The image processing unit 103 repeatedly carries out the flow shown in FIG. 21 in pixel units based on the pixel values of the input image to determine and output pixel values of an HDR image as an output image.

Figure 20:
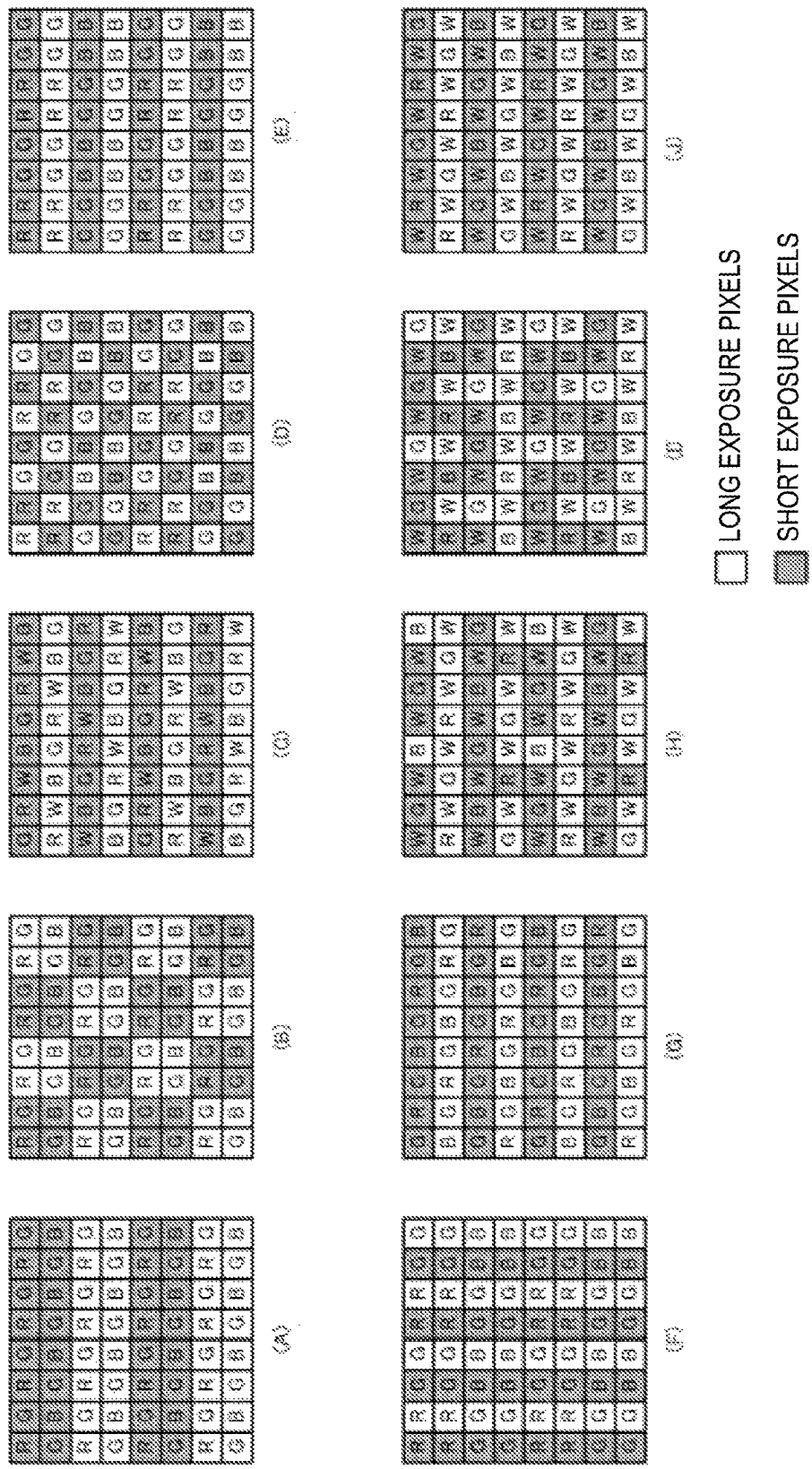
FIGS. 20A to 20J are diagrams useful in explaining example configurations of an image pickup element.

Note that the image picked up by the image pickup element 102 in the image pickup apparatus 100 shown in FIG. 6 is an image in which short exposure pixels and long exposure pixels are mixed as described for example with reference to FIG. 7 or FIG. 20. The image processing unit 103 successively inputs and processes the respective pixel values of the image in which such short exposure pixels and long exposure pixels are mixed.

The processing in the respective steps in the flowchart shown in FIG. 21 will now be described.

Step S101

The image processing unit 103 inputs a pixel value at a focus pixel position to be processed from the image pickup element (image sensor) 102.

Step S102

Pixel values in the vicinity of the focus pixel position are read as vicinity pixel values. Note that as one example, a vicinity pixel region is assumed to be a rectangular region of 7 by 7 pixels centered on the focus pixel and is set in advance.

Step S103

By carrying out a pixel interpolation process using the inputted focus pixel and short exposure pixels included in the vicinity pixels, a short exposure image where all of the pixels are set at short exposure pixels is generated.

Step S104

By carrying out a pixel interpolation process using the inputted focus pixel and long exposure pixels included in the vicinity pixels, a long exposure image where all of the pixels are set at long exposure pixels is generated. The interpolation processes in steps S103 and S104 are processing carried out by the sensitivity-specific interpolation unit 201 described with reference to FIGS. 9 and 10.

Step S105

Exposure compensation in keeping with the exposure ratio (the exposure ratio between the short exposure pixels and the long exposure pixels) is carried out on the short exposure image generated by the interpolation process in step S103 to generate an exposure-compensated short exposure image. More specifically, pixel values of the short exposure image are multiplied by an exposure constant in keeping with the exposure ratio to generate the exposure-compensated short exposure image.

Step S106

Exposure compensation in keeping with the exposure ratio is carried out on the long exposure image generated by the interpolation process in step S104 to generate the exposure-compensated long exposure image. More specifically, pixel values of the long exposure image are multiplied by an exposure constant in keeping with the exposure ratio to generate the exposure-compensated long exposure image. The compensation processes in steps S105 and S106 are processing carried out by the exposure compensation units (multiplier units) 221, 222 in the HDR blending/blur correcting unit 202 shown in FIG. 11.

Step S107

The exposure-compensated short exposure image and the exposure-compensated long exposure image are used to calculate the blur information. As described earlier, the blur information is an index value showing the degree of blurring of the long exposure image. The processing in step S107 is processing carried out by the blur information measuring unit 223 in the HDR blending/blur correcting unit 202. As described earlier with reference to FIGS. 12 and 13, the blur information measuring unit 223 calculates the single color blur information $M_R$, $M_G$, $M_B$ according to Equation 4 described earlier and outputs the maximum value out of such blur information as the blur information M of the corresponding pixel.

Step S108

The exposure-compensated short exposure image generated in step S105, the constants $n_0$, $n_1$ decided from the exposure-compensated short exposure image and a unique noise model of the sensor (image pickup element), and the like are used to calculate the noise variance value $V_S(x,y)$ of the corresponding pixel in the short exposure image.

Step S109

The exposure-compensated long exposure image generated in step S106, the constants $n_0$, $n_1$ decided from the exposure-compensated long exposure image and a unique noise model of the sensor (image pickup element), and the like are used to calculate the noise variance value $V_L(x,y)$ of the corresponding pixel in the long exposure image.

The processes in steps S108 and S109 are processing carried out by the noise estimating units 271, 272 in the blending coefficient computation unit 263 shown in FIG. 15. As described earlier, the noise estimating units 271, 272 calculate the noise variance $V_L(x,y)$ of the exposure-compensated long exposure image and the noise variance $V_S(x,y)$ of the exposure-compensated short exposure image at the focus pixel (x,y) according to the equations given below.

$$V_L(x, y) = (n_1 \times D_L(x, y) + n_0)$$
$$V_S(x, y) = (n_1 \times (D_S(x, y) \div E) + n_0) \times E^2$$
$$= n_1 \times E \times D_S(x, y) + n_0 \times E^2$$

where $D_L$ is a pixel value of an exposure-compensated long exposure pixel, $D_S$ is a pixel value of an exposure-compensated short exposure pixel, E is the exposure ratio between short exposure and long exposure, and $n_1$ and $n_0$ are constants in keeping with the sensor and the sensitivity.

Step S110

The short exposure image noise variance value $V_S(x,y)$ calculated in step S108, the long exposure image noise variance value $V_L(x,y)$ calculated in step S109, the blur information M calculated in step S107, and the exposure-compensated short exposure image generated in step S105 are used to calculate the blending coefficient β showing the blending ratio for blending pixel values of the exposure-compensated long exposure image in pixel values of the HDR image that is the output image.

The processing in step S110 is processing by the blending coefficient computation unit 263 shown in FIG. 15. As described earlier with reference to FIG. 15, the computation unit 273 calculates the blending coefficient calculating value βp to be used when calculating the final blending coefficient β according to the calculation given below.

$$\beta p = (V_S)/(V_S + V_L + M)$$

where $V_L$ is the noise variance of the exposure-compensated long exposure image, $V_S$ is the noise variance of the exposure-compensated short exposure image, and M is the blur information.

In addition, the near-saturation blending coefficient calculation unit 274 calculates the blending coefficient calculating value βq for adjusting the blending coefficient β in a vicinity of the long exposure pixels becoming saturated using a broken line such as the graph shown in FIG. 16.

In addition, the minimum value selecting unit 275 selects the minimum value out of the two blending coefficient calculating values βp, βq, that is, (a) the blending coefficient calculating value βp calculated by the computation unit 273 so that $\beta p = (V_S)/(V_S + V_L + M)$ and (b) the blending coefficient calculating value βq calculated by the near-saturation blending coefficient calculation unit 274, that is, the blending coefficient calculating value βq with the setting shown in FIG. 16 and outputs the selected value as the blending coefficient β of the exposure-compensated long exposure image. The processing in step S110 is the calculation process of the blending coefficient β described here.

Step S111

A process that blends the exposure-compensated short exposure image generated in step S105 and the exposure-compensated long exposure image generated in step S106 in keeping with the blending coefficient β calculated in step S110 is carried out to calculate a pixel value of the HDR image.

The processing in step S111 is processing carried out by the blending unit 225 and the single color blending units 281 to 283 described with reference to FIGS. 17 and 18. As described earlier, the single color blending units 281 to 283 calculate the pixel value $D_H$ of the HDR image to be outputted according to the equation given below.

$$D_H = (1-\beta) \times D_S + \beta \times D_L$$
$$= \beta \times (D_L - D_S) + D_S$$

where $D_L$ is a pixel value in the exposure-compensated long exposure image, $D_S$ is a pixel value in the exposure-compensated short exposure image, and β is the blending coefficient. As a result of the blending process according to the above equation, a pixel value of the HDR image is obtained.

Step S112

Downstream signal processing is carried out. This processing is carried out by the signal processing unit 104 shown in FIG. 6. Typical camera signal processing, such as camera signal processing like white balance adjustment and gamma correction, and also encoding processing and the like for storage in a storage unit as necessary are carried out on the HDR image generated by the image processing unit 103.

In step S113, it is determined whether the above processing has been carried out on every pixel. If unprocessed pixels remain, an unprocessed pixel is inputted in step S101 and the processing in step S102 onwards is carried out for the unprocessed pixel. Meanwhile, if processing of every pixel has ended, in step S114, the processed image (HDR image) is outputted as an output image or stored in a storage unit. Note that the above processing can be carried out according to a program stored in a memory for example under the control of a control unit.

8. Conclusion

Preferred embodiments of the present disclosure have been described above in detail with reference to the attached drawings. It should be understood by those skilled in the art that various modifications, combinations, sub-combinations and alterations may occur depending on design requirements and other factors insofar as they are within the scope of the appended claims or the equivalents thereof.

Additionally, the present technology may also be configured as below.

(1) An image processing apparatus comprising:

an image processing unit generating a pixel value of an output image by carrying out a pixel value blending process on a long exposure image and a short exposure image, wherein the image processing unit includes:

an exposure compensation unit carrying out exposure compensation of the long exposure image and the short exposure image in keeping with an exposure ratio between long exposure and short exposure;

a blur information measuring unit using the long exposure image and the short exposure image after the exposure compensation to calculate blur information that is an index value showing a degree of discrepancy between pixel values at a corresponding pixel position in the long exposure image and the short exposure image;

a blending coefficient calculating unit using the blur information to decide a blending coefficient as a blending ratio to be used in the pixel value blending process on the pixel values at the corresponding pixel position in the long exposure image and the short exposure image; and a blending unit carrying out the pixel value blending process on the pixel values at the corresponding pixel position in the long exposure image and the short exposure image using the blending coefficient calculated by the blending coefficient calculating unit to decide the pixel value of the output image.

(2) The image processing apparatus according to (1), wherein the image processing unit inputs one image in which long exposure pixels and short exposure pixels are mixed, and further includes:

a sensitivity-specific interpolation unit carrying out an interpolation process on an input image to generate a long exposure image in which all pixels are set at pixel values of long exposure pixels and a short exposure image in which all pixels are set at pixel values of short exposure pixels; and an exposure compensation unit carrying out exposure compensation in keeping with an exposure ratio between the long exposure pixels and the short exposure pixels on the long exposure image and the short exposure image outputted by the sensitivity-specific interpolation unit, and the blur information measuring unit calculates the blur information using the exposure-compensated long exposure image and the exposure-compensated short exposure image generated by the exposure compensation unit.

(3) The image processing apparatus according to (1) or (2), wherein the blending coefficient calculating unit uses the blur information to decide the blending coefficient as the blending ratio to be used in the pixel value blending process on the pixel values at the corresponding pixel position in the exposure-compensated long exposure image and the exposure-compensated short exposure image.

(4) The image processing apparatus according to any one of (1) to (3), wherein the blending unit decides the pixel value of the output image by carrying out the pixel value blending process on the pixel values at the corresponding pixel position in the exposure-compensated long exposure image and the exposure-compensated short exposure image using the blending coefficient calculated by the blending coefficient calculating unit.

(5) The image processing apparatus according to any one of (1) to (4), wherein the blur information measuring unit calculates the blur information for each color using the long exposure image and the short exposure image that have been subjected to the exposure compensation and outputs a maximum value out of the blur information for each color at each pixel position as the blur information corresponding to each pixel.

(6) The image processing apparatus according to any one of (1) to (5), wherein the blur information measuring unit includes a noise estimating unit estimating noise included in the long exposure image and the short exposure image and calculates the blur information corresponding to a pixel by subtracting the noise estimated by the noise estimating unit from a value calculated based on a difference in pixel values of corresponding pixels in the long exposure image and the short exposure image that have been subjected to the exposure compensation.

(7) The image processing apparatus according to any one of (1) to (6), wherein for pixels where a pixel value in the long exposure image is at a saturation level, the blending coefficient calculating unit calculates a blending coefficient that suppresses the blending ratio of the pixel value of the long exposure image.

(8) The image processing apparatus according to any one of (1) to (7), wherein the blending unit carries out the pixel value blending process on the pixel values at corresponding pixel positions in the long exposure image and the short exposure image to generate a high dynamic range (HDR) image as the output image.

In addition, the configuration of the present disclosure further includes a method of processing carried out by the apparatus and system described above, a program for executing such processing, and a recording medium on which such program is recorded.

Furthermore, the processing sequence that is explained in the specification can be implemented by hardware, by software and by a configuration that combines hardware and software. In a case where the processing is implemented by software, it is possible to install in memory within a computer that is incorporated into dedicated hardware a program in which the processing sequence is encoded and to execute the program. It is also possible to install a program in a general-purpose computer that is capable of performing various types of processing and to execute the program. For example, the program can be installed in advance in a storage medium. In addition to being installed in a computer from the storage medium, the program can also be received through a network, such as a local area network (LAN) or the Internet, and can be installed in a storage medium such as a hard disk or the like that is built into the computer.

Note that the various types of processing that are described in this specification may not only be performed in a temporal sequence as has been described, but may also be performed in parallel or individually, in accordance with the processing capacity of the device that performs the processing or as needed. Furthermore, the system in this specification is not limited to being a configuration that logically aggregates a plurality of devices, all of which are contained within the same housing.

As described above, according to the configuration of an embodiment of the present disclosure, an apparatus and method that generate an HDR image by carrying out a pixel value blending process on long exposure pixels and short exposure pixels are realized.

More specifically, an image processing apparatus includes an image processing unit generating a pixel value of an output image by carrying out a pixel value blending process on a long exposure image and a short exposure image. The image processing unit includes: a blur information measuring unit measuring blur information using the long exposure image and the short exposure image; a blending coefficient calculating unit using the measured blur information to decide a blending coefficient for the long exposure image and the short exposure image; and a blending unit carrying out the pixel value blending process on the long exposure image and the short exposure image using the blending coefficient calculated by the blending coefficient calculating unit. By controlling the blending coefficient based on the blur information, it is possible to generate a high-quality HDR image where the influence of blurring is reduced.

The present disclosure contains subject matter related to that disclosed in Japanese Priority Patent Application JP 2011-190055 filed in the Japan Patent Office on Aug. 31, 2011 and Japanese Priority Patent Application JP 2011-277629 filed in the Japan Patent Office on Dec. 19, 2011, the entire content of which is hereby incorporated by reference.

What is claimed is:

1. An image processing apparatus comprising:
an image processing unit generating a pixel value of an output image by carrying out a pixel value blending process on a long exposure image and a short exposure image,
wherein the image processing unit includes:
an exposure compensation unit carrying out exposure compensation of the long exposure image and the short exposure image in keeping with an exposure ratio between long exposure and short exposure;
a blur information measuring unit using the long exposure image and the short exposure image after the exposure compensation to calculate blur information that is an index value showing a degree of discrepancy between pixel values at a corresponding pixel position in the long exposure image and the short exposure image;
a blending coefficient calculating unit using the blur information to decide a blending coefficient as a blending ratio to be used in the pixel value blending process on the pixel values at the corresponding pixel position in the long exposure image and the short exposure image; and
a blending unit carrying out the pixel value blending process on the pixel values at the corresponding pixel position in the long exposure image and the short exposure image using the blending coefficient calculated by the blending coefficient calculating unit to decide the pixel value of the output image.

2. The image processing apparatus according to claim 1, wherein the image processing unit inputs one image in which long exposure pixels and short exposure pixels are mixed, and further includes:
a sensitivity-specific interpolation unit carrying out an interpolation process on an input image to generate a long exposure image in which all pixels are set at pixel values of long exposure pixels and a short exposure image in which all pixels are set at pixel values of short exposure pixels; and
an exposure compensation unit carrying out exposure compensation in keeping with an exposure ratio between the long exposure pixels and the short exposure pixels on the long exposure image and the short exposure image outputted by the sensitivity-specific interpolation unit, and
the blur information measuring unit calculates the blur information using the exposure-compensated long exposure image and the exposure-compensated short exposure image generated by the exposure compensation unit.

3. The image processing apparatus according to claim 2, wherein the blending coefficient calculating unit uses the blur information to decide the blending coefficient as the blending ratio to be used in the pixel value blending process on the pixel values at the corresponding pixel position in the exposure-compensated long exposure image and the exposure-compensated short exposure image.

4. The image processing apparatus according to claim 2, wherein the blending unit decides the pixel value of the output image by carrying out the pixel value blending process on the pixel values at the corresponding pixel position in the exposure-compensated long exposure image and the exposure-compensated short exposure image using the blending coefficient calculated by the blending coefficient calculating unit.

5. The image processing apparatus according to claim 1, wherein the blur information measuring unit calculates the blur information for each color using the long exposure image and the short exposure image that have been subjected to the exposure compensation and outputs a maximum value out of the blur information for each color at each pixel position as the blur information corresponding to each pixel.

6. The image processing apparatus according to claim 1, wherein the blur information measuring unit includes a noise estimating unit estimating noise included in the long exposure image and the short exposure image and calculates the blur information corresponding to a pixel by subtracting the noise estimated by the noise estimating unit from a value calculated based on a difference in pixel values of corresponding pixels in the long exposure image and the short exposure image that have been subjected to the exposure compensation.

7. The image processing apparatus according to claim 1, wherein for pixels where a pixel value in the long exposure image is at a saturation level, the blending coefficient calculating unit calculates a blending coefficient that suppresses the blending ratio of the pixel value of the long exposure image.

8. The image processing apparatus according to claim 1, wherein the blending unit carries out the pixel value blending process on the pixel values at corresponding pixel positions in the long exposure image and the short exposure image to generate a high dynamic range (HDR) image as the output image.

9. An image processing method executed by an image processing apparatus, comprising:
executing, with an image processing unit, image processing that generates a pixel value of an output image by carrying out a pixel value blending process on a long exposure image and a short exposure image,
wherein the image processing includes:
carrying out exposure compensation of the long exposure image and the short exposure image in keeping with an exposure ratio between long exposure and short exposure;
using the long exposure image and the short exposure image after the exposure compensation to calculate blur information that is an index value showing a degree of discrepancy between pixel values at a corresponding pixel position in the long exposure image and the short exposure image;
using the blur information to decide a blending coefficient as a blending ratio to be used in the pixel value blending process on the pixel values at the corresponding pixel position in the long exposure image and the short exposure image; and
carrying out the pixel value blending process on the pixel values at the corresponding pixel position in the long exposure image and the short exposure image using the calculated blending coefficient to decide the pixel value of the output image.

10. A method comprising:
using an image processing unit to generate a pixel value of an output image by carrying out a pixel value blending process on a long exposure image and a short exposure image;
using an exposure compensation unit to carry out exposure compensation of the long exposure image and the short exposure image in keeping with an exposure ratio between long exposure and short exposure;
using a blur information measuring unit to use the long exposure image and the short exposure image after the exposure compensation to calculate blur information that is an index value showing a degree of discrepancy between pixel values at a corresponding pixel position in the long exposure image and the short exposure image;
using a blending coefficient calculating unit to use the blur information to decide a blending coefficient as a blending ratio to be used in the pixel value blending process on the pixel values at the corresponding pixel position in the long exposure image and the short exposure image; and
using a blending unit to carry out the pixel value blending process on the pixel values at the corresponding pixel position in the long exposure image and the short exposure image using the blending coefficient calculated by the blending coefficient calculating unit to decide the pixel value of the output image.

11. A method according to claim 10, further comprising:
using the image processing unit to input one image in which long exposure pixels and short exposure pixels are mixed;
using a sensitivity-specific interpolation unit to carry out an interpolation process on an input image to generate a long exposure image in which all pixels are set at pixel values of long exposure pixels and a short exposure image in which all pixels are set at pixel values of short exposure pixels;

using an exposure compensation unit to carry out exposure compensation in keeping with an exposure ratio between the long exposure pixels and the short exposure pixels on the long exposure image and the short exposure image outputted by the sensitivity-specific interpolation unit; and using the blur information measuring unit to calculate the blur information using the exposure-compensated long exposure image and the exposure-compensated short exposure image generated by the exposure compensation unit.

12. A method according to claim 10, further comprising:
using the blending coefficient to calculating unit to use the blur information to decide the blending coefficient as the blending ratio to be used in the pixel value blending process on the pixel values at the corresponding pixel position in the exposure-compensated long exposure image and the exposure-compensated short exposure image.

13. A method according to claim 10, further comprising:
using the blending unit to decide the pixel value of the output image by carrying out the pixel value blending process on the pixel values at the corresponding pixel position in the exposure-compensated long exposure image and the exposure-compensated short exposure image using the blending coefficient calculated by the blending coefficient calculating unit.

14. A method according to claim 10, further comprising:
using the blur information measuring unit to calculate the blur information for each color using the long exposure image and the short exposure image that have been subjected to the exposure compensation and outputs a maximum value out of the blur information for each color at each pixel position as the blur information corresponding to each pixel.

15. A method according to claim 10, further comprising:
using the blur information measuring unit to include a noise estimating unit estimating noise included in the long exposure image and the short exposure image and calculates the blur information corresponding to a pixel by subtracting the noise estimated by the noise estimating unit from a value calculated based on a difference in pixel values of corresponding pixels in the long exposure image and the short exposure image that have been subjected to the exposure compensation.

16. A method according to claim 10, further comprising:
using the blending unit to carry out the pixel value blending process on the pixel values at corresponding pixel positions in the long exposure image and the short exposure image to generate a high dynamic range (HDR) image as the output image.

* * * * *